United States Patent
Basile et al.

(10) Patent No.: US 8,695,103 B2
(45) Date of Patent: Apr. 8, 2014

(54) APPARATUS FOR AND A METHOD OF COPY-PROTECTING A CONTENT CARRYING RECORDING MEDIUM

(75) Inventors: Carmen Laura Basile, Maidenhead (GB); Adrian Aylward, Newbury (GB); Jonny Boyd Reckless, Maidenhead (GB)

(73) Assignee: Rovi Solutions Corporation, Santa Clara, CA (US)

( * ) Notice: Subject to any disclaimer, the term of this patent is extended or adjusted under 35 U.S.C. 154(b) by 1927 days.

(21) Appl. No.: 11/715,075

(22) Filed: Mar. 7, 2007

(65) Prior Publication Data

US 2008/0222737 A1    Sep. 11, 2008

(51) Int. Cl.
    *H04L 29/00*    (2006.01)
(52) U.S. Cl.
    USPC .............................. 726/27; 713/176; 380/201
(58) Field of Classification Search
    USPC .................... 369/53.21; 714/42; 726/1, 27
    See application file for complete search history.

(56) References Cited

U.S. PATENT DOCUMENTS

| | | | |
|---|---|---|---|
| 7,000,152 B1 * | 2/2006 | Lin | 714/42 |
| 2002/0144153 A1 | 10/2002 | LeVine et al. | |
| 2003/0185130 A1 | 10/2003 | Kamperman et al. | |
| 2005/0185926 A1 | 8/2005 | Basile et al. | |
| 2005/0259546 A1 * | 11/2005 | Basile et al. | 369/53.21 |

OTHER PUBLICATIONS

International Search Report for International application No. PCT/US2008/002894 dated Jul. 8, 2008, 1 page.

* cited by examiner

*Primary Examiner* — Brandon Hoffman
*Assistant Examiner* — Michael D Anderson
(74) *Attorney, Agent, or Firm* — Inventive Patent Law P.C.; Jim H. Salter

(57) ABSTRACT

Recording data has content data and navigation control data to enable a legitimate player to navigate the content data. The recording data has a content data set and a spurious data set that is difficult to distinguish from the content data set but will ignored by a legitimate player. The content data is associated with the content data set and the spurious data set. The spurious data set may be associated with control data that inhibit playing or correct playing of the content data. A ghost structure such as a ghost video title set my be provided by causing information in at least one of the video title set information, video manager information and the volume information file structure to reference a non-existent video title set or not reference an existing video title set. The recording medium may be an optical disc such as a DVD or its precursors.

23 Claims, 17 Drawing Sheets

APPARATUS FOR AND A METHOD OF COPY-PROTECTING A CONTENT CARRYING RECORDING MEDIUM

FIELD OF THE INVENTION

This invention relates to an apparatus for and a method of copy-protecting a content carrying recording medium against unauthorised copying of that content where the recording medium is an optical disc (or a precursor thereof) or other recording medium from which content data that can be accessed in a nonsequential manner using navigational data stored by the recording medium, to a recording medium having such copy protection and to copy-protected data for recordal on a recording medium. For simplicity, a recording medium from which content data that can be accessed in a non-sequential manner using navigational data stored by the recording medium is referred to hereinafter simply as a "recording medium".

BACKGROUND OF THE INVENTION

The advent of digital recording techniques has enabled digital copies of digital content carried by recording media such as optical discs (for example DVDs) to be made with little or no loss of copy quality. This makes it easy for an unauthorised person to produce unauthorised copies of digital content-carrying recording media. Accordingly, copy-protection techniques have been developed. Most current copy-protection techniques exploit differences in the ways a legitimate player and an unauthorised copying apparatus or "ripper" would access a recording medium in order to defeat copying while preserving good playability. As an example, a legitimate DVD player follows a navigational path on the DVD that is defined by navigational commands and control data carried by the DVD whereas most unauthorised copying apparatus or rippers access the content of a DVD file-by-file or sector-by-sector. Accordingly, production of good quality or playable copies by a file-by-file or sector-by-sector unauthorised copying apparatus can be frustrated by adding subversive data (that is data that detrimentally affects at least one of the copying process, copy quality and playability of a copy) to a part of the digital data that does not form part of the navigational path of the DVD so that the subversive data is ignored by a legitimate player but detrimentally affects the production of an unauthorised copy. As another possibility, data may be altered to affect the digital sum value (DSV) of some of the digital data in a manner which does not affect a legitimate player but interferes with an unauthorised copying apparatus or "ripper".

The above types of copy-protection may prevent digital copying of the content of an optical disc such as a DVD by a ripper that copies the data on a sector-by-sector or a file-by-file basis. However, other more sophisticated rippers may be able to parse navigation information contained on the optical disc so as to select the content data be copied. Thus, for example, so-called "IFO parsing rippers" are capable of parsing navigation information contained on a DVD and automatically selecting the "main title" or the "main program chain (PGC)" for ripping or allowing the user the possibility of selecting a particular title or a particular program chain from amongst those available.

SUMMARY OF THE INVENTION

An embodiment provides apparatus and a method for providing, for recordal onto a recording medium, recording data having content data and control data for enabling a player playing such a recording medium to navigate through the content data. The recording data is provided as a content data set and a spurious data set that resembles the content data set to make it difficult for a copying apparatus attempting to copy a recording medium carrying the recording data to distinguish between the content data set and the spurious data set. The content data of the content data set is associated with both the content data set and with the spurious data set. The content data set may be associated with control data that enable a player accessing the content data set to play the content data correctly while the spurious data set may be associated with control data that inhibit a player accessing the spurious data set from at least one of playing the content data and playing the content data correctly and part of the control data may be play control data that, when a player plays the recording medium, enables the player to ignore the spurious content data set. A ghost structure such as a ghost video title set may be provided by causing information in at least one of the video title set information, video manager information and the volume information file structure to at least one of reference a video title set that is not present in the recording data and not reference a video title set that is present in the recording data.

An embodiment provides apparatus and a method for providing recording data to be recorded onto a recording medium, such that the recording data comprises at least one video title set having content data comprising a video object data set, video title set information for the video title set, video manager information and a volume information file structure and such that a ghost structure, such as a ghost video title set, is provided in the recording data by causing information in at least one of the video title set information, video manager information and the volume information file structure to at least one of reference a video title set that is not present in the recording data and not reference a video title set that is present in the recording data.

An embodiment provides apparatus and a method for providing recording data to be recorded onto a recording medium in which recording data (which comprises at least one video title set having content data comprising a video object data set, video title set information for the video title set, video manager information and a volume information file structure) is provided with at least one of a ghost title, a ghost video title set, a ghost PGC (Program Chain) or a ghost cell by rendering information in at least one of the video title set information, video manager information and the recording volume information file structure inconsistent with the video title set or sets in the recording data.

The invention also provides a method of providing such recording data, the recording data itself and a recording medium carrying the recording data.

The recording medium may be an optical disc such as a DVD or a precursor thereof such as Digital Linear Tape, glass master, or stamping master, or may be any other form of recording medium from which content data that can be accessed in a non-sequential manner using navigational data stored by the recording medium.

BRIEF DESCRIPTION OF THE DRAWINGS

Embodiments of the present invention will now be described, by way of example, with reference to the accompanying drawings, in which.

DETAILED DESCRIPTION OF EMBODIMENTS

Figure 1:
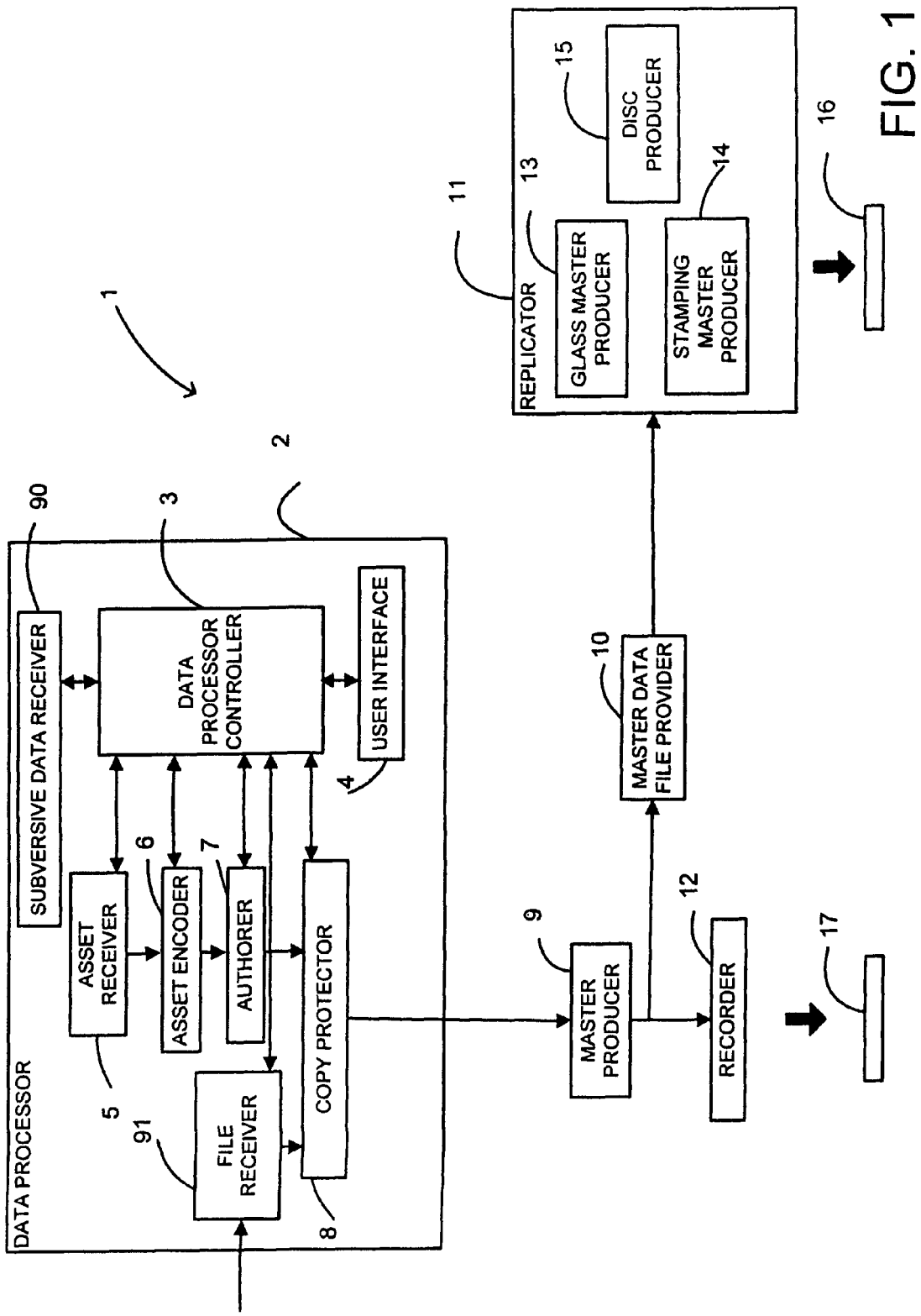
FIG. 1 shows a functional block diagram of producing apparatus for producing a copy-protected optical disc such as a DVD.

Referring now to FIG. 1, a producing apparatus 1 has a data processor 2 operable, under user control, to provide recording data to be recorded onto an optical disc, in this case a Digital Versatile Video Disc (DVD-Video, abbreviated to DVD herein), which recording data is copy-protected by providing a spurious data set that resembles a content data set to make it difficult for a copying apparatus attempting to copy a recording medium carrying the recording data to distinguish between the content data set and the spurious data set and by associating content data of the content data set with both the content data set and with the spurious data set. In an embodiment, the content data set is associated with control data that enable a player accessing the content data set to play the content data correctly, the spurious data set is associated with control data that inhibit a player accessing the spurious data set from at least one of playing the content data and playing the content data correctly, and play control data is provided that, when a player plays the recording medium, enables the player to ignore the spurious content data set.

The data processor 2 has a controller 3 to control overall operation of the data processor 2, a user interface 4 operable to provide a user with information and to receive instructions from the user, an asset receiver 5 operable to receive assets (such as the video data file or data files plus any additional audio data files and graphics data files for logos, menus and the like) selected by the user to form the content of the DVD and an assets encoder 6, operable, under the control of the controller 3 and in accordance with user instructions received via the user interface 4, to effect any required encoding of the assets to ensure that the assets are in a format specified by the DVD standard with which the DVD is to comply, for example MPEG 2 for video data.

The data processor also has an authorer 7 that enables the user, via the user interface 4, to specify parameters of the DVD being produced such as the video format and disc size, to import encoded assets from the asset encoder 6, to synchronise assets, and to add chapter points, create menus and so on to ensure that the final DVD has the required presentation data (that is the audio and video content data to be delivered to a viewer by a DVD player) and navigation data (comprising general control data, search control data, user interface control data and navigation control data) to enable navigation through the content of the DVD in a non-sequential manner in accordance with the appropriate DVD standard. The authorer 7 thus, under user control, multiplexes the assets, adds navigation and control information according to the appropriate DVD standard specification and writes out an authored data file or final disc image or DDP (Disc Description Protocol) File Set containing the appropriate DVD specification data files in a directory. The authorer 7 is generally also able to simulate the resulting DVD so that the user can review and check their work.

The data processor 2 may also have a file receiver 91 to receive already authored DVD-Video content in the form of DVD-Video files, or as an image file or as a DDP File Set.

The data processor 2 may also include a subversive data receiver 90 operable to receive subversive data.

The data processor 2 also has a copy protector 8 to provide copy protection to a DVD-Video file, an image file or a DDP File Set provided by the authorer 7 or by the file receiver 91, as will be described below. Where authoring is to be carried out by the authorer 7, the functionality provided by the copy protector 8 may form part of the authorer so that the copy protection can be effected during the authoring process that results in the DDP File Set.

The data processor 2 is coupled to provide the copy-protected file to a master producer 9 configured to carry out a conventional mastering process including encoding the copy-protected image file or DPP File Set in accordance with the appropriate DVD standard specification to produce channel code data for recording, that is to carry out processes such as scrambling, interleaving, error correction and EFM plus encoding in accordance with the appropriate DVD standard specification.

The master producer 9 is arranged to provide the resulting master file to at least one of a local recorder 12 and a master data file provider 10 which in known manner provides a data file, for example a digital linear tape (DLT) file, for supply to a replicator 11. The replicator 11 will normally, although not necessarily, be located remotely of the remainder of the producing apparatus and will generally have a glass master producer 13 to cut a glass master, a stamping master producer 14 to produce from the glass master stamping masters and a disc producer 15 to produce the final DVD discs 16 from the stamping masters. Any local recorder 12 will be in the form of a DVD writer that writes or records on writable or rewritable DVD discs to produce one or more recorded discs 17. The master producer 9 is shown as a separate component but may be part of the data processor 2 or its functionality may possibly be provided by the recorder 12 and master data file provider 10.

Figure 2:
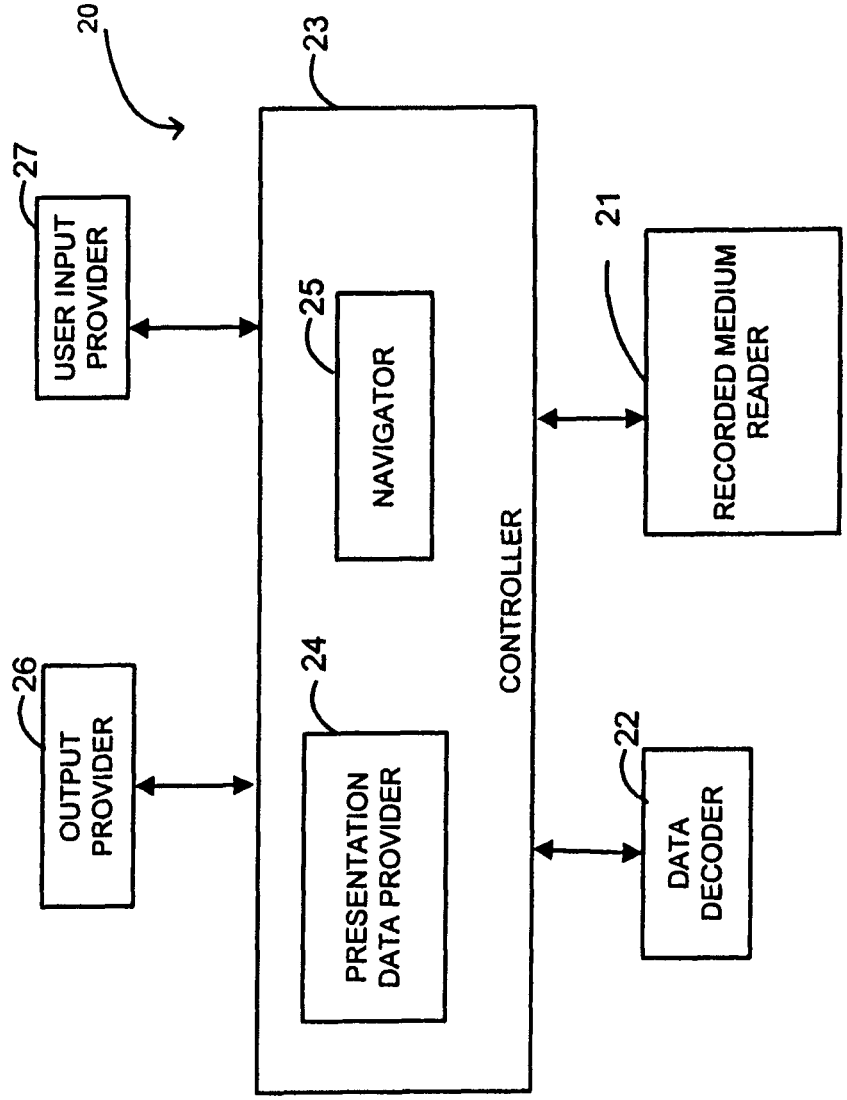
FIG. 2 shows a functional block diagram of reading apparatus for reading a copy-protected optical disc such as a DVD.

FIG. 2 shows a block diagram of a player 20 suitable for playing a copyprotected DVD produced by the apparatus shown in FIG. 1. The player 20 may be a dedicated DVD player or could be a personal or other computer having DVD playing capability. The player 20 has a recorded medium reader 21 with read head circuitry operable to read sectors of data from a recorded DVD and a data decoder 22 operable to decode channel data read by the read head circuitry. Although not shown in FIG. 2, as is conventional, the data decoder 22 has a clock extractor for extracting a clock signal, a de-interleaver or de-shuffler for de-shuffling sectors and a channel decoder for decoding the channel data.

The player 20 has a controller 23 which controls overall operation of the reading apparatus and which includes a presentation data provider 24 to provide presentation data to an output provider 26 which is generally in the form of a display such as a monitor or TV display, but could be a communications link to a display. The controller 23 also provides a navigator 25 to control the location on the DVD that is read by the read head circuitry of the recording medium reader 21 in accordance with user input instructions received via a user input provider 27 (which may be a keyboard, pointing device and/or a remote control, for example) and navigation or control data read from the DVD.

It will of course be appreciated that the functional components shown in FIGS. 1 and 2 simply illustrate the provided functionality and should not be taken to imply that these functional components necessarily exist as discrete physical entities. Rather, the functionality may be provided by one or more physical components and, in the latter case, the functionality provided by a single functional component shown in FIG. 1 or 2 may be distributed between different physical components. In addition, different aspects of the functionality may not be identifiable as separate functionality.

The functional components shown in FIGS. 1 and 2 may, as appropriate, be provided by hardware, firmware, software or any combination of these.

Figure 3:
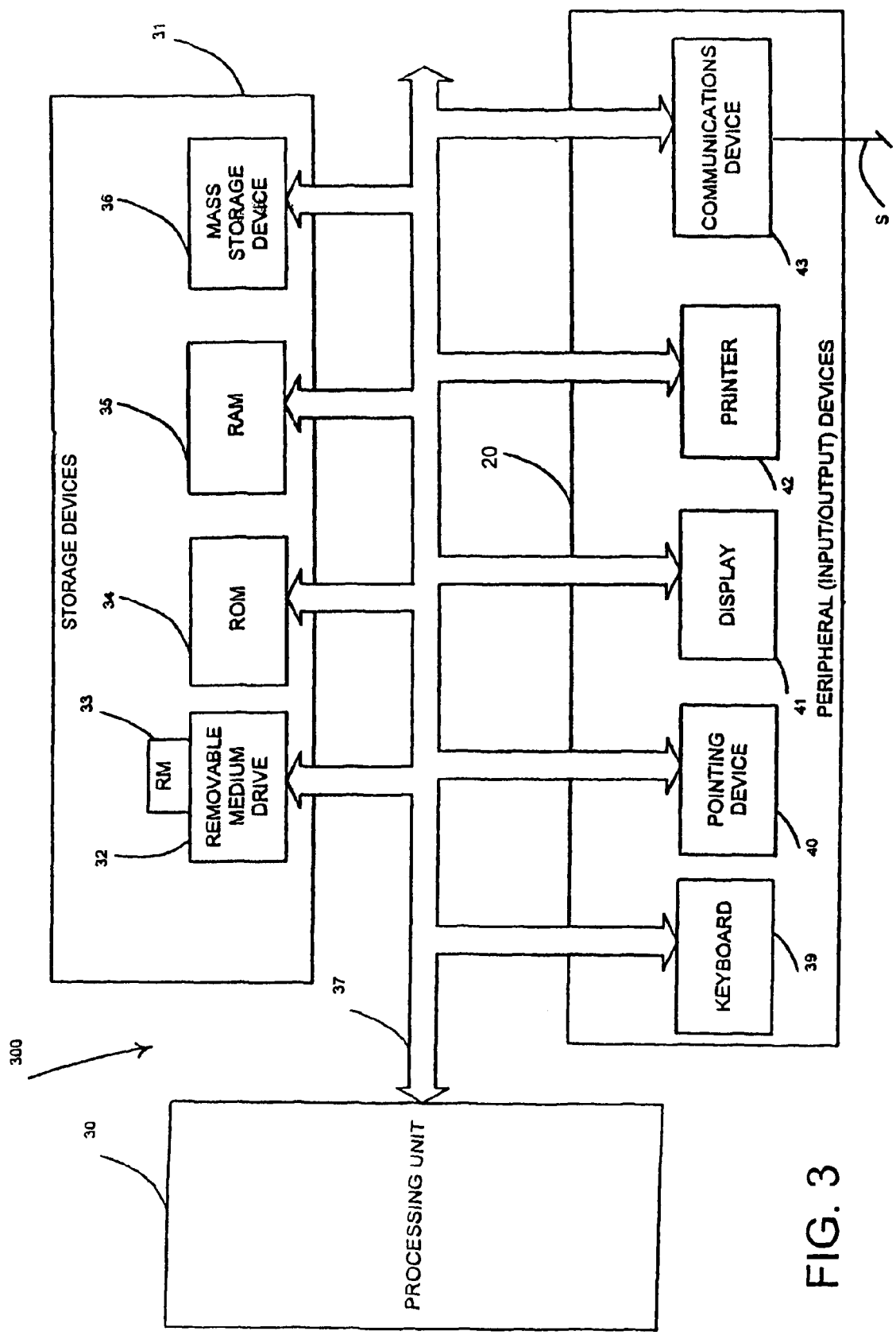
FIG. 3 shows a functional block diagram of computing apparatus that may be programmed to provide the copying apparatus shown in FIG. 1.

FIG. 3 shows a functional block diagram of computing apparatus 300 that may be programmed by program instructions to provide, for example, at least one of the data processor 1, master producer 9, recorder 12 and master data file provider 10 shown in FIG. 1 and/or the player 20 shown in FIG. 2.

The computing apparatus 300 comprises a processing unit 30 coupled by one or more buses 37 to storage devices 31 which comprise a removable medium drive 32 for receiving a removable medium RM 33 (in this case a DVD drive for receiving a DVD and/or a DLT drive), a read only memory (ROM) 34, a random access memory (RAM) 35 and a mass storage device 36 such as a hard disc drive.

The bus 37 also couples the processing unit 30 to a number of peripheral input/output devices that may form the user interface 20 of FIG. 1 and the output provider 26 and user input provider 27 of FIG. 2, in this case a keyboard 39, a pointing device 40 and a display 41. The peripheral devices may also include a communications device 43 to provide network communication and, optionally, a printer 42. The communications device 43 may be, for example, a MODEM, network card or the like for enabling the computing apparatus 300 to communicate over a network which may be the Internet but could alternatively or additionally be an intranet, a local area network, wide area network or any other suitable form of network.

It will, of course, be appreciated that the storage devices and input/output devices may not comprise all of those shown in FIG. 3 and/or could comprise additional devices. For example, one or more further removable medium drives, such as a floppy disc drive and a Digital Linear Tape (DLT) drive, may be provided and other input/output devices such as a microphone and a loudspeaker may be provided.

Figure 4:
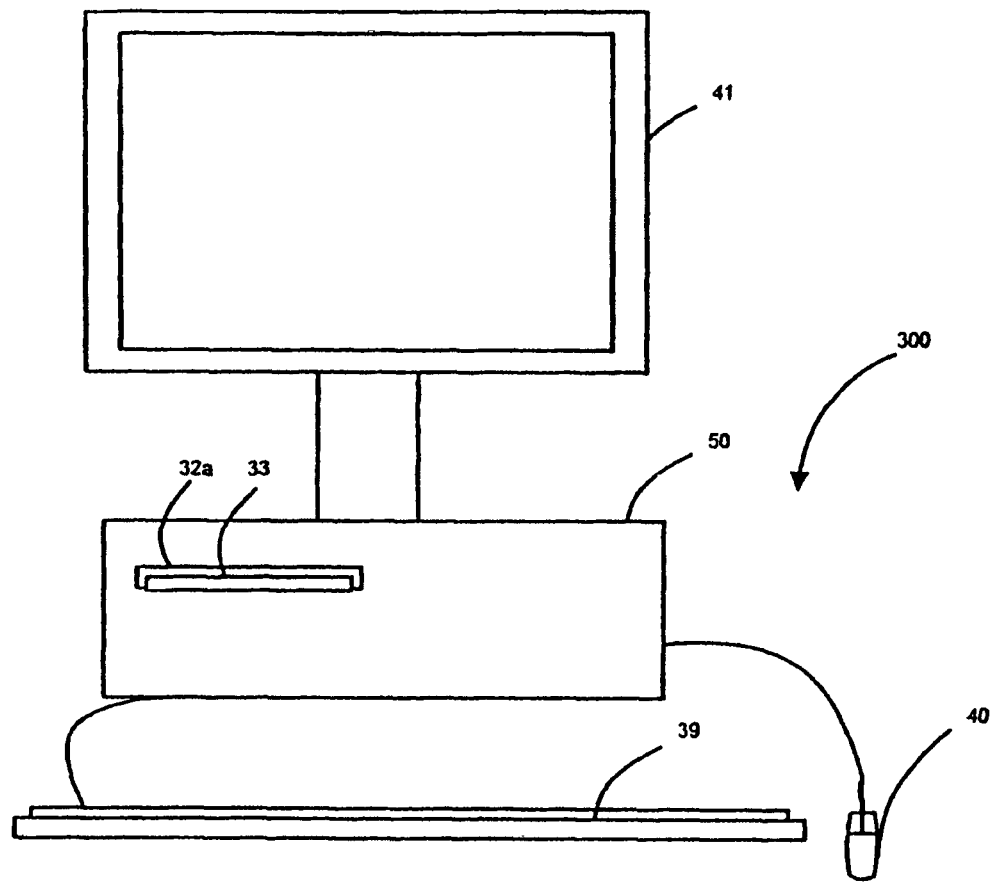
FIG. 4 shows a diagram illustrating an example of computing apparatus having the functionality shown in FIG. 3.

As shown diagrammatically in FIG. 4, the computing apparatus may be a personal computer or server 300a which has a main processor unit 50 containing the processing unit 30 and storage devices 31 and user interface devices in the form, as shown, of a keyboard 39, mouse 40 and display 41. FIG. 3 shows a removable medium 33 being ejected from an insertion slot 32a of the removable medium drive 32.

The computing apparatus 300 or 300a may be programmed to provide the copying apparatus 1 shown in FIG. 1 by program instructions supplied by any one or more of the following routes:

1. pre-stored in the ROM 34 and/or the mass storage device 36;
2. input by a user using an input device such as the keyboard 39 and/or the pointing device 40.
3. downloaded from a removable medium 33 received by the removable medium drive 32; and
4. supplied as a signal S via the communications device 43.

Of course, where apparatus has different physical components, then these may be provided by programming of corresponding respective computing apparatus.

The apparatus shown in FIG. 1 enables a DVD to be produced that carries information and/or data that makes it difficult for an IFO-parsing ripper to identify which data on the DVD that actually forms part of the main title or titles carried by the DVD, without significantly increasing the size of the DVD video zone recorded on the DVD.

To facilitate understanding of how the apparatus 1 shown in FIG. 1 functions, the structure of a DVD first needs to be discussed.

A DVD has a complex and non-linear structure with multiple elementary streams being interleaved and multiple discrete elements of content organized in a structured and hierarchical manner within a DVD video zone. Navigation to and through the digital presentation data stored on a DVD is controlled by navigation data which may be present at different levels in the physical data structure of the DVD video zone. The presentation data of a DVD video zone thus cannot be played simply by the player 20 accessing the recorded data in sequential manner from the beginning to the end of the recording of the data on the DVD. Rather, the navigation path or paths taken through the content by the player 20 depend(s) upon the navigator 25 of the player 20, the way the DVD is authored, and interaction with the user.

A DVD comprises a physical data structure and a logical data structure in the form of a logical hierarchy that overlies the physical data structure. The physical data structure determines the manner in which data is organised on a DVD with, in accordance with the DVD standards, data being stored in a sequential and physically contiguous or sequential manner on the DVD. The logical data structure determines the grouping of video sequences and the play back order of blocks of video in a sequence. The data to be recorded on the disc is organised in physical sectors. Each physical sector consists of a SYNC block, a header, a data pack and error detection code. In order to ensure that channel coding rules are met and to minimise the effect of defects on the disc, the data of these sectors have error correction parity codes added and are interleaved in blocks of 16 sectors (an ECC block) before channel coding in accordance with the EFM+(8 to 16 modulation) channel coding scheme of the DVD format and the channel coded data is stored onto a DVD in the form of pits and lands. When recording the data, ISO/UDF file system information (in accordance with ISO9660/UDF (Universal Disc Format)) is recorded on the disc so that a DVD player can subsequently locate and therefore access each sector of the disc. The final data recorded on a single layer DVD consists of a lead-in section, then the program data section, and then a lead-out section.

Figure 5:
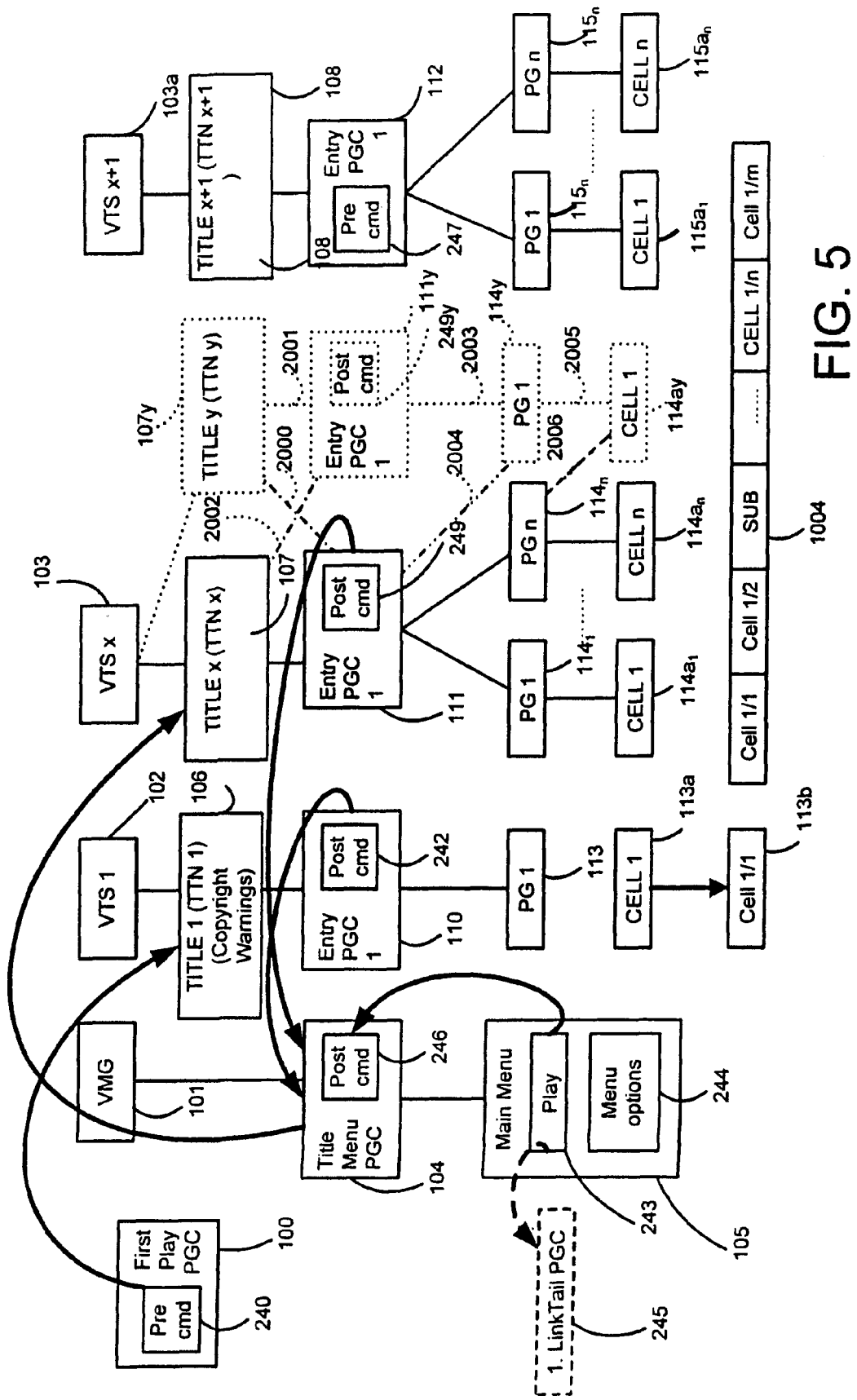
FIG. 5 shows a diagram for explaining the navigational and presentation data structure of an example of a DVD Video protected according to one embodiment of the present invention.
Figure 6:
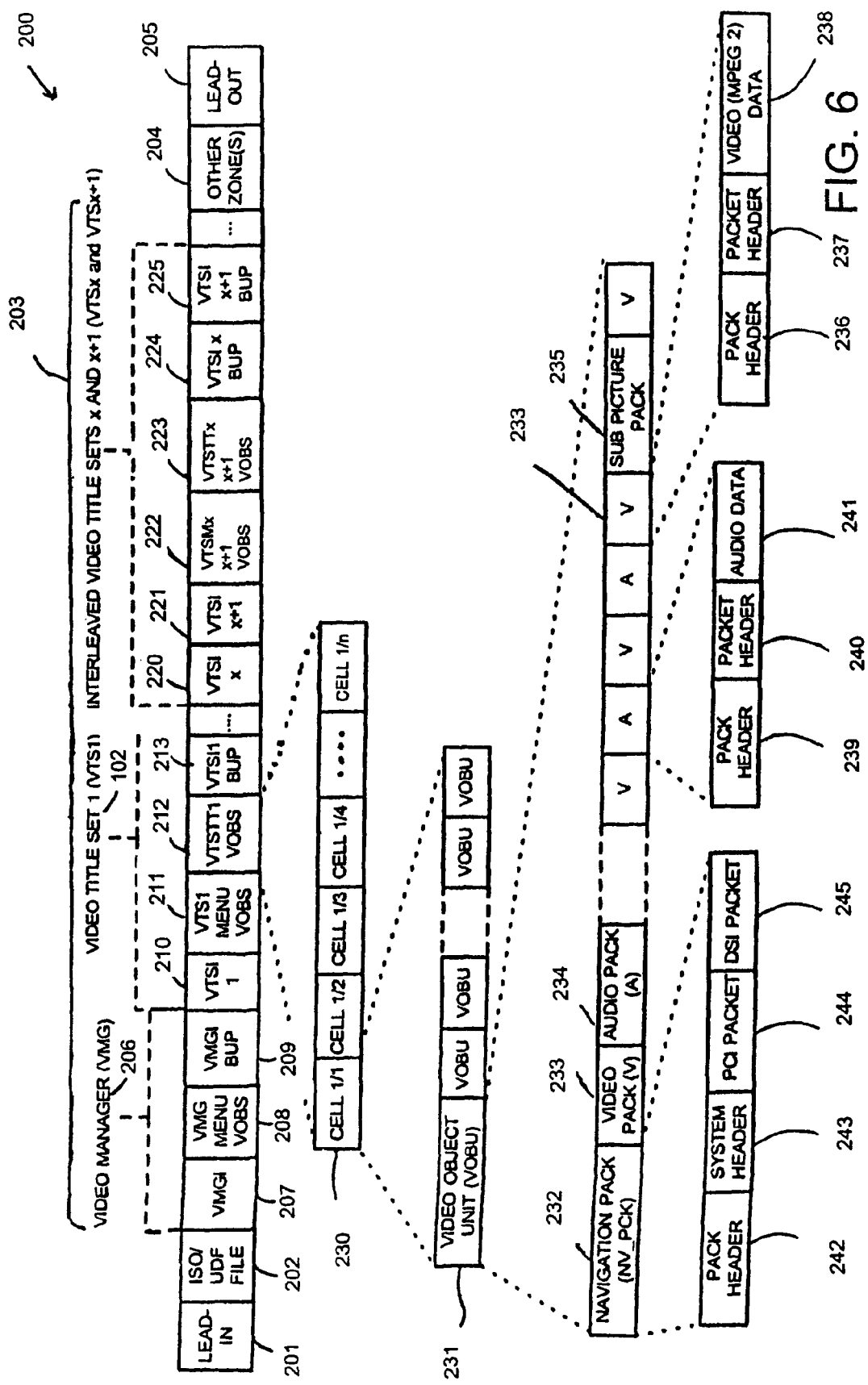
FIG. 6 shows a diagram for explaining the physical data structure of a protected DVD-Video protected in accordance with an embodiment of the invention.

FIG. 5 shows a diagram for explaining, by way of an illustrative example, the presentation and navigation data structure of a DVD Video protected according to an embodiment of the present invention while FIG. 6 shows a diagram for illustrating the structure of a protected DVD Video zone.

As shown in FIG. 5, the navigation data structure comprises a first play program chain (PGC) 100 which is the first program chain to be executed when the disc is first inserted into a DVD player, a video manager (VMG) 101 and video title sets (VTSs).

The video manager 101 provides control information for the entire DVD video zone. In the example shown in FIG. 5, the video manager 101 has a title menu program chain 104 which, as shown, corresponds to the main menu 105. However, the DVD video zone need not necessarily have a title menu.

The number of video title sets will depend upon the particular DVD structure. FIG. 5 shows three video title sets, a first video title set VTS 102 for introductory data such as copyright warnings and the like, an $x^{th}$ video title set VTSx 103 for the main content of the DVD (which content may be a film (movie), music video, or the like) and an $x+1^{th}$ spurious video title set VTSx 103a that is, as will be described below, configured to appear to an IFO-parsing ripper as if it is a main title video title set.

Each video title set will usually have a language folder and one or more title folders. The language folder is associated with one or more menu program chains (PGCs) for providing menus to be displayed to the user to enable the user to select various options such as language, cut, aspect ratio (widescreen or not) and so on, while the title folder is associated with at least one title program chain (a title may contain up to $2^{15}-1$ program chains). For simplicity, FIG. 5 shows only the title folders. In the example illustrated, the first video title set VTS 1 102 has a single title folder 106 (Title 1 (TTN 1)) for copyright warnings while the $x^{th}$ video title set VTSx 103 has a single title folder 107 (Title x (TTN x)) and the $x+1^{th}$ spoof video title set VTSx+1 has a single title folder 108 (Title x+1 (TTN x+1)).

Each title folder 106, 107 and 108 has at least one program chain (PGC). The first program chain in a title is known as the entry program chain ("entry PGC"). As shown in FIG. 5, each title folder has a single program chain 110, 111 and 112. The program chains 110, 111 and 112 therefore form the entry PGCs, Each program chain comprises program chain information (PGCI) comprising navigation data which controls access to components of a program chain and contains from 0 to 99 programs (PG). A program chain may contain no programs but only PGCI. Such a program chain is known as a dummy program chain. For example, the first play program chain is a dummy program chain. The program chains have pre-commands and post-commands that can be used to define the order in which the program chains are accessed by a player. In the example shown in FIG. 5, a pre-command 240 of the first play PGC 100 causes a player to jump to the title 1 (TTN 1) title folder 106 and then to play the copyright warnings of the entry program chain 110 of first video title set 102. The entry program chain 110 has a post-command 242 to cause the player to jump to the title menu entry program chain 104 of the Video Manager and to display the main menu which in this example has a play button 243 and other menu options 244. A link tail PGC command 245 is provided to cause, in response to selection of the play button 243 by a user of the player, the player to exit the main menu and then execute a post command 246 of the title menu entry program chain 104 to cause the title x (which constitutes the main title in this example) to be played. The entry program chain 110 of the title x has a post command 249 to cause the player to return to the main menu after playing the title.

As an illustration, FIG. 5 shows the program chain 110 as having a single program (PG 1) 113, the program chain 111 as having n programs (PG 1 to PG n) 114] to $114_n$ and the program chain 112 as having n programs (PG 1 to PG n) 115i to $115_n$.

Each program has one logical cell or a sequence of logical cells that map to a corresponding physical cell or physical cells of the presentation data structure. In the example of FIG. 5, each program 113, 114j to $114_n$, and 115i to $115_n$ has a single logical cell 113a, 114ai to $114a_n$, and 115ai to $115a_n$. In the example shown, the logical cell 113a maps to a single physical cell 113b. The logical cell to physical cell mapping for the logical cells 114aj to 114an and 115ai to $115a_n$ is not shown in FIG. 5 but will be discussed further below with reference to FIG. 6.

FIG. 6 shows how a structure such as the one shown in FIG. 5 may be laid out on a DVD Volume 200. A DVD volume layout 200 has a lead-in 201 followed by ISO/UDF file system information 202, a DVD video zone 203, possibly one or more other zones 204, and finally a lead-out 205. The DVD video zone has a video manager (VMG) 206 consisting of video manager information (VMGI) 207 comprising navigation data for the entire DVD video zone in a single file identified as VIDEO_TS.IFO, a video manager menu video object set (VMG MENU VOBS) 208 provided as a single file identified as VIDEOJTS.VOB, and a back up file of the video manager information (VMGI BUP) 209 in a single file VIDEOJTS.BUP. The video manager menu video object set 208 usually includes the presentation data for the title menu and any other non-dummy menu program chains.

Each video title set (VTS) consists of video title set information (VTSI) comprising navigation data to control the presentation of titles and menus in the video title set in a single file VTS_##_O.IFO (where ## represents a two digit number between 01 and 99 representing the video title set number), a menu video object set for any video title set menu video objects (VTS MENU VOBS) which typically contains the content for all types of menu within the video title set in a single file VTS_##_O.VOB (as in the example shown in FIG. 5 there may be no menus within the video title set and so no VTS MENU VOBS), a video title object set (VTSTT VOBS) for the video title set in one or more files identified as VTS_##_@.VOB (where @ is single digit number between 1 and 9) and a back up of the video title set information (VTSI BUP) in a single file identified as VTS_##_O.BUP.

Normally, the disc volume is configured so that the video title sets are arranged one after another and so that, for each video title set (VTS), the video title set information (VTSI) is followed by any menu video object set (VTS MENU VOBS), then the video object set (VTSTT VOBS) for the video titles and finally the back up of the video title set information (VTSI BUP). This conventional arrangement is shown in FIG. 6 for the video title set VTSI 102 in which the video title set information (VTSI 1) 210 is followed by any menu video object set (VTS 1 MENU VOBS) 211, then the video title object set (VTSTT 1 VOBS) 212 for the video titles and finally the back up of the video title set information (VTSI 1 BUP) 213.

Each video object set (VOBS) consists of a sequence of physical cells. For clarity in the diagram, FIG. 6 shows part of the physical cell set (CELL 1/1 to CELL 1/n) only for the title video object set 212 of the video title set 1 (VTSI) 102. Each physical cell consists of one or more video object units (VOBUs) which each represent approximately 0.4 to one second of playback time (that is a number of consecutive frames). For simplicity in FIG. 6, the structure of only one physical cell 230 and one video object unit (VOBU) 231 of that physical cell 230 is shown.

As shown in FIG. 6, each video object unit consists of a navigation pack (NV_PCK) 232 followed by an integer number of video (V), audio (A) and sub-picture (S) packs 233, 234 and 235. On a DVD, each pack occupies one sector of user data on the disc (2048 bytes). Each video pack 233 consists of a pack header 236 identifying the pack followed by a packet header 237 identifying the packets within the pack and then the video data 238 in accordance with the DVD format, that is MPEG2 format. Similarly, each audio pack consists of a pack header 239 identifying the pack followed by a packet header 240 identifying the packets within the pack and the audio data 241 which may be in any format appropriate for DVD, for example MPEG, DTS, DD, LPCM, AC3.

Each navigation pack (NV_PCK) 232 consists of a pack header 242 identifying the pack, followed by a system header 243 and two navigation data packets 244 and 245. The first of the two packets 244 comprises presentation control information (PCI) for controlling control menu display and program presentation in real time and the second packet 245 comprises data search information (DSI) for controlling forward/reverse scanning and seamless branching. DVD players contain a track buffer to enable variable rate and seamless playback. There is therefore a time delay between reading by the read head and decoding and playing of the audio and video data. Therefore real time control information is distributed between and stored within the PCI and DSI packets and the player checks and utilises this information before and after the corresponding physical cell passes through the track buffer. Navigation packs 232 are thus used by the navigation engine or navigator 25 of the DVD player to ensure playback, trick play modes and search operations are executed successfully and in a timely manner.

It will be understood from the above that the DVD video zone thus includes navigation data that controls access and interactive playback and that navigation data exists at different levels within the DVD video zone. The navigation data includes control commands (for example for format, language, audio selection, sub-picture selection, parental management, display mode and display aspect), navigation commands (for example for general system parameters, system parameters, navigation timer and menu buttons), and search and user interface commands (for example for PGCI searches to enable selection of a particular menu or presentation data searches enable selection of a title, part of title (chapter), and so on).

Figure 7:
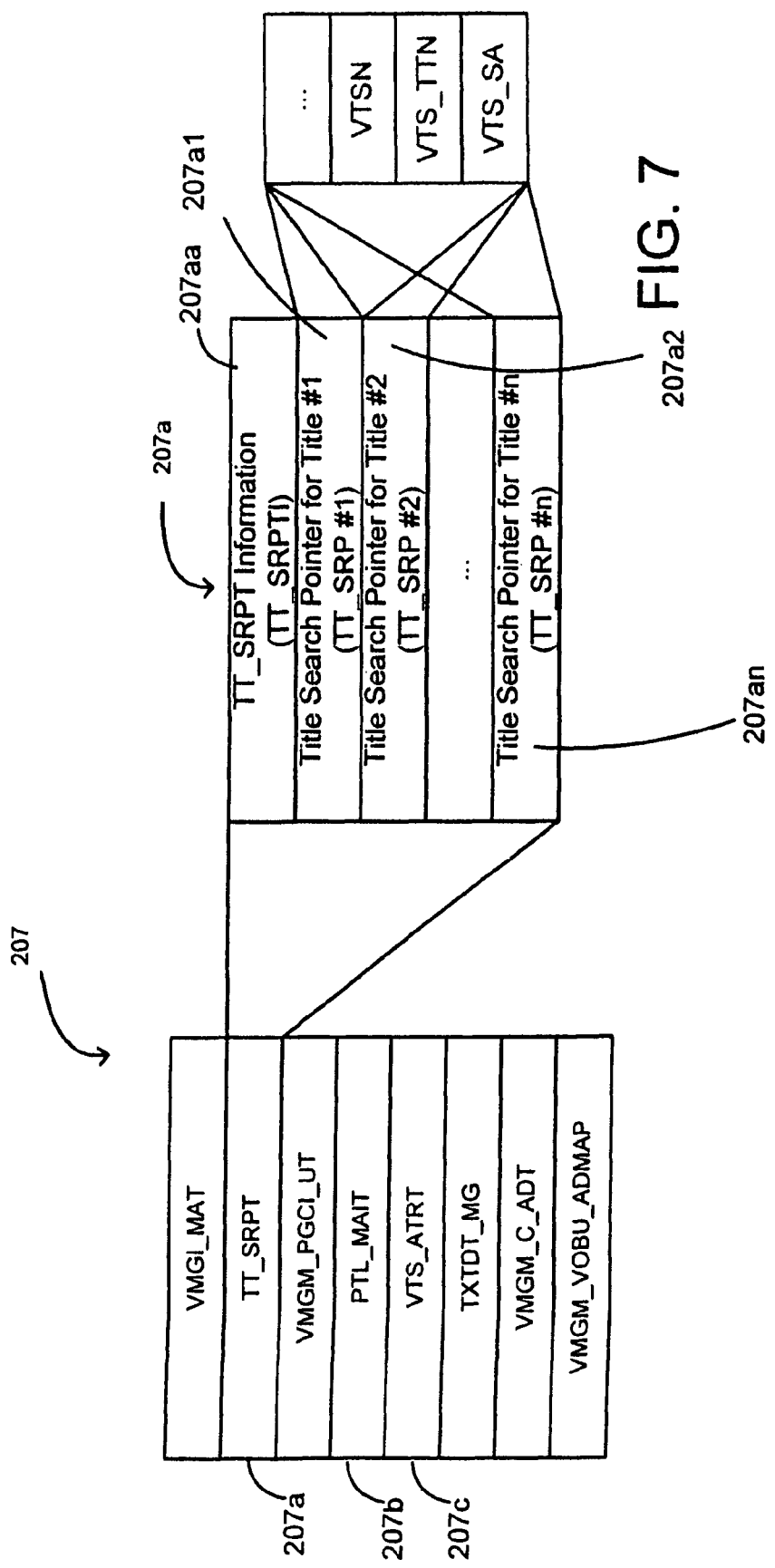
FIG. 7 shows a video manager information (VGMI) table of a DVD.

FIG. 7 shows the structure of the Video Manager Information (VGMI) 207 which comprises navigation data such as, for example: the number and attributes of title sets; pointers to titles in a Title Search Pointer Table (TT_SPRT) 207a; a parental management information table (PTL_MAIT) 207b; attributes of the title menu (VMGM) video stream, audio stream and sub-pictures in a Video Title Set Attribute Table (VTS_ATRT) 207c; and so on. The Title Search Pointer Table (TT_SPRT) 207a has Title Search Pointer Table information 207aa and a Title Search Pointer 207a1, 207a2 ... 207an for each title (as an example titles #1, #2 ... #n are shown).

Figure 8A:
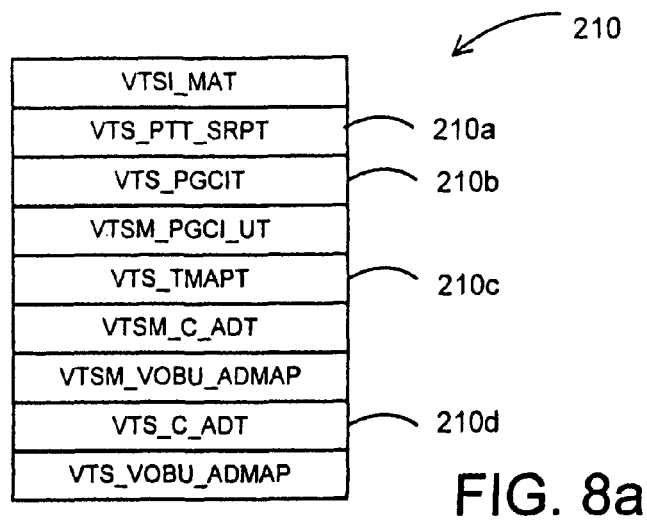
FIGS. 8a to 8d show a video title set information (VTSI) table of a DVD.
Figure 8B:
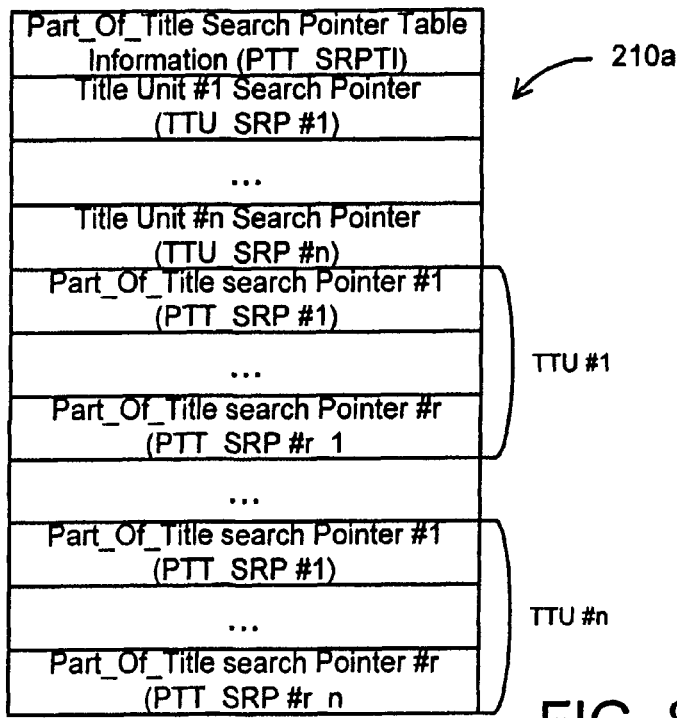
Figure 8C:
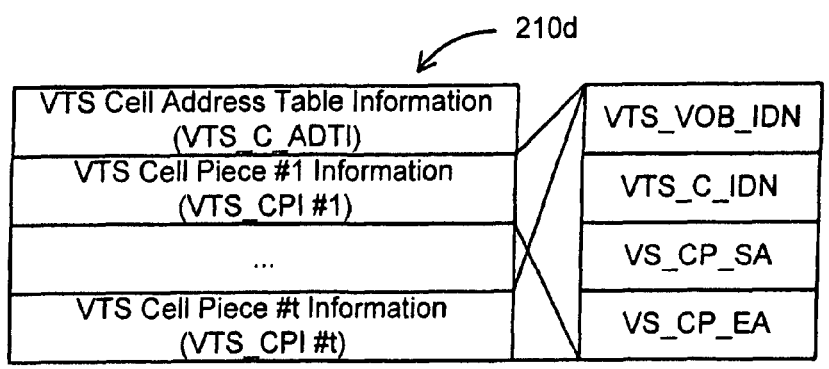
Figure 8D:
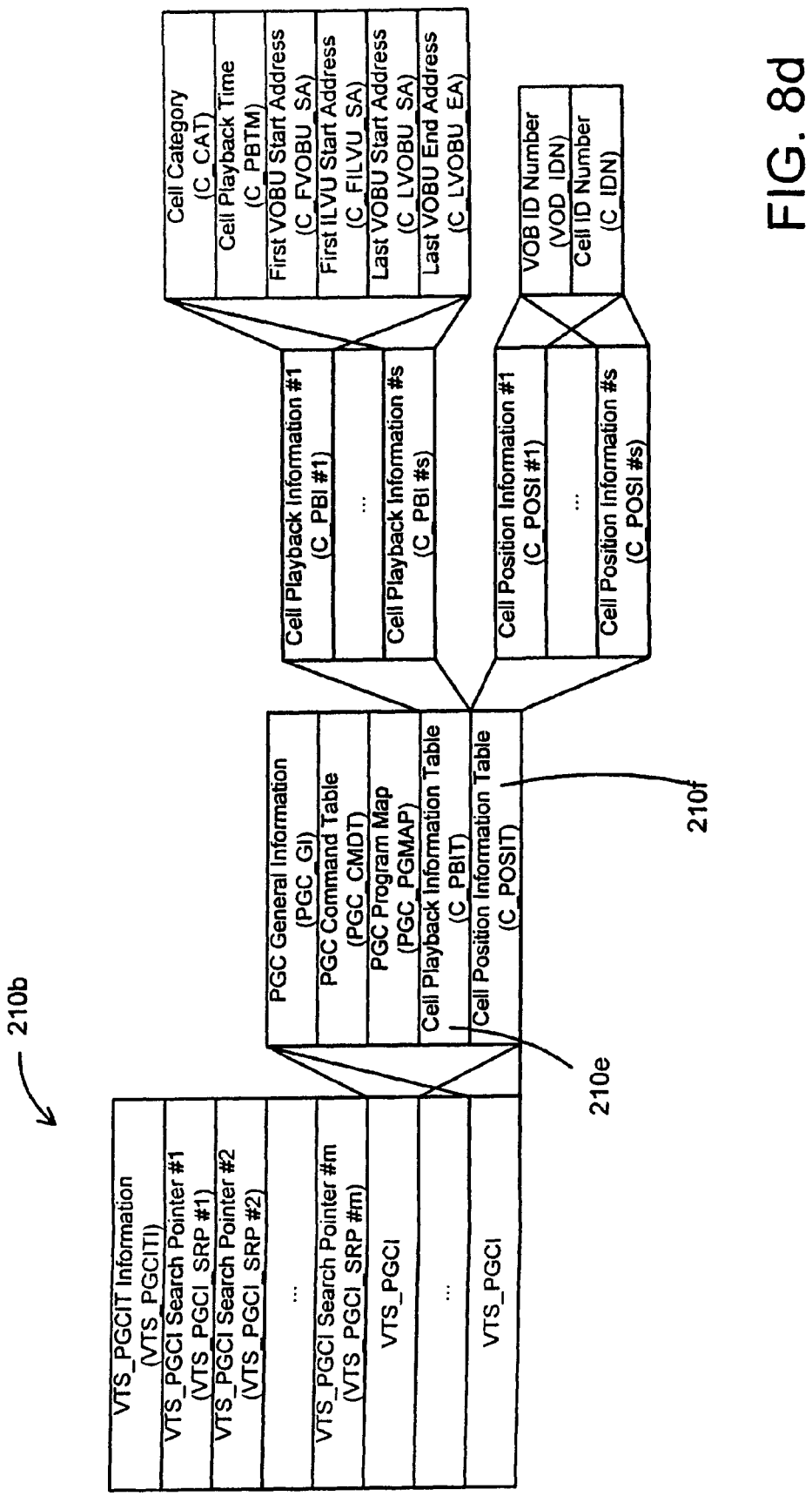

FIG. 8a show the structure of, the video title set information (VTSI) 210 of a video title set which comprises navigation data such as, for example: pointers to chapters in a Video Title Set Part of Title Search Pointer Table (VTS_PTT_SRPT) 210a; pointers to program chains in a Video Title Set Program Chain Information Table (VTSJPGCIT) 210b; time maps in a Video Title Set Time Map Table (VTSJTMAPT) 210c; a Video Title Set Cell Address Table (VTS_C_ADT) 210d and so on. The Video Title Set Part of Title Search Pointer Table (VTS_PTT_SRPT) 210a is shown in FIG. 8b and the Video Title Set Cell Address Table (VTS_C_ADT) 210d is shown in FIG. 8c. FIG. 8d shows the Video Title Set Program Chain Information Table (VTS_PGCIT) 210b which includes VTS program chain information (VTS_PGCI) which is associated with a program chain information including a cell playback information table (C_PBIT) 210e and a cell position information table (CJPOSIT) 210f.

In a program chain, the program chain information (PGCI) comprises navigation data such as, for example: the number of the programs within the chain; prohibited user operations; links between program chains; playback mode; pre-commands to be executed before accessing any of the programs of the chain; cell commands; and post-commands to be executed after accessing the programs of the chain.

In a video object unit, the presentation control information (PCI) comprises navigation data such as, for example: prohibited user operations, button information, non-seamless angle jump pointers, and presentation times while the data search information (DSI) comprises navigation data such as, for example: presentation times, audio gap lengths, VOBU pointers for forward and reverse scanning, video synchronisation pointers to audio and sub-picture packs reference picture pointers, link to next interleaved unit, and seamless angle jump pointers.

In a program chain, navigation commands can be included as discussed above as pre-commands to be executed before reading any cell(s) of the program chain and/or as post-commands to be executed after reading the cell(s) of the program chain. Examples of program chain navigation commands include "go to" instructions to go to a command number, "link to" instructions to program chain number, part of title number, cell number and so on, "jump" instructions to move out of the current domain or state of the DVD playback, and SPRM and GPRM setting and manipulating instructions and "comparison" instructions, so allowing conditional actions, for example allowing a "go to" or "jump" instruction to be executed in the event a certain comparison is true or a certain SPRM or GPRM parameter is set to a certain value.

Figure 9:
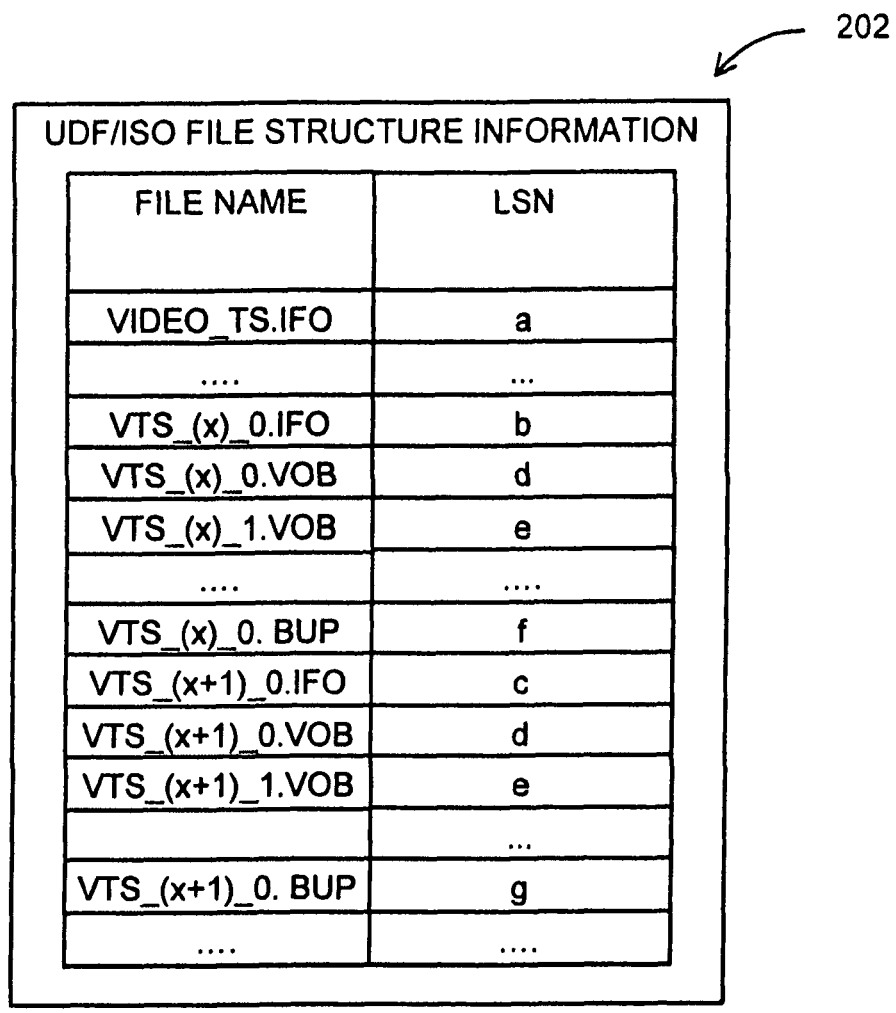
FIG. 9 shows a UDF/ISO file structure information table of a DVD.

FIG. 9 shows the UDF/ISO file structure information. The UDF/ISO file structure information 202 provides, as shown in FIG. 9, a logical sector number (LSN) for each file on the DVD to enable a DVD player 20 to locate the files on the disc.

The explanation so far with respect to FIGS. 5 and 6 is a simplified overview of the DVD format of a DVD-Video protected according to an embodiment of the present invention. For a more detailed description of the DVD format and recording process, reference should be made to the publicly available DVD standards.

As mentioned above, normally, the disc volume is configured so that the video title sets are arranged one after another and so that, for each video title set (VTS), the video title set information (VTSI) is followed by any menu video object set (VTS MENU VOBS), then the title video object set (VTSTT VOBS) for the video titles and finally the back up of the video title set information (VTSI BUP). However, in accordance with an embodiment of the present invention, instead of arranging all of the video title sets in sequence, the copy protector 8 is configured to incorporate (for example under user instruction via the user interface 4 or in accordance with pre-programming or instructions received from another apparatus) a spurious or spoof video title set (the x+1[1] video title set VTS x+1 103*a* as shown in FIGS. 5 and 6 into the DVD zone by interleaving the spurious video title set with another video title set (the x[1] video title set in FIG. 5) so that, as shown in FIG. 6: the video title set information (VTSIx) 220 for the xth video title set VTSx 103 is followed by the video title set information (VTSIx+1) 221 for the x+1th video title set-VTSx+1 103*a;* the video title set information (VTSIx+1) 221 for the x+1th video title set VTS x+1 103*a* is followed by any menu video object set(s) for the Xth and x+1* video title set VTSx 103 and VTS x+1103*a* which may as shown be provided as a single video object set file (VTSM x, x+1 VOBS) 222 shared by the video title sets VTS x 103 and VTS x+1 103*a* or may be provided as two separate consecutive files;

any menu video object set(s) file (VTSM x, x+1 VOBS) 222 (or in the event there are no menu object sets, the video title set information (VTSIx+1) 221 for the x+1th video title set VTSx+1 103*a*) is(are) followed by a title video object set (VTSTTx, x+1 VOBS) 223 which may, as shown, be provided as a single file (VTSTTx, x+1 VOBS) 223 shared by the video title sets VTS x 103 and VTS x+1 103*a* or may be provided as two separate consecutive files; and the shared video title object set (VTSTTx, x+1 VOBS) 223 is followed by the back up of the video title set information (VTSI x BUP) 224 for the video title set VTS x 103 and then the back up of the video title set information (VTSIx+1 BUP) 225 for the video title set VTSx+1 103 *a.*

Thus, the menu video object set VTSMJVOBS (if there is one) for VTSx and VTSx+1 may be shared and there may, for example, be only one physical VTSM_VOBS that is referenced both by VTSIx and VTSIx+1, although the one physical occurrence of this VTSM_VOBS may be referenced twice by the UDF/ISO File System information, as the two files, VTS_X_O.VOB and VTS_x+1_O.VOB. The title video object set VTSTT_VOBS for VTSx and VTSx+1 may similarly be shared but may comprise more than one VOB file VTS_XX_i.VOB, that is i=1, ... n.

This organisation of course affects the mapping between the physical and logical cells. Thus, taking the example shown in FIG. 5, the fact that the two video title sets share a video title object set (VTSTTx, x+1 VOBS) 223 means that the logical cells 114*ai* to 114*a$_n$* may map to the same set of physical cells as the logical cells 115*aj* to 115*a$_n$*, as shown in FIG. 5 a set of physical cells Cell 1/1 to Cell 1/m. For simplicity, the actual logical cell to physical cell mapping is not shown in FIG. 5 for the logical cells 114*aj* to 114*a$_n$* and 115*ai* to 115*a$_n$*. It will of course be appreciated that FIG. 5 is only an example and that different configurations are possible, provided that in this example the logical cells 114*ai* to 114*a$_{nmap}$* to the same set of physical cells as the logical cells 115*ai* to 115*a$_n$*.

The logical cells l\5a\ to 115*a$_n$*, within the spurious VTSx+1 may reference the VTSTT_VOBS in some incorrect manner. For example, they may reference the physical cells comprising the main feature in scrambled order or they may reference, possibly multiple times, only a subset of them).

In order to inhibit unauthorised copying or at least render an unauthorised copy difficult to play or of very bad quality, in the event a copying apparatus copies a DVD file-by-file or sector-by-sector, one or more physical cell or cells may, as shown in FIG. 5 provide a subversive region ("SUB") 1004 that contains subversive data that detrimentally affects the production of and/or playability of an unauthorised copy. Such subversive cells will not form part of the navigational path of the DVD and so will not affect the ability of a legitimate player to play the DVD. Such subversive cells may not be pointed to by any of the logical cells or may be pointed to only by logical cells of the spurious or spoof video title set VTSx+1 or may be pointed to by some logical cells in the main title but skipped during playback because of some suitable pre or post cell commands. As an example, such subversive data may subvert the reading capabilities of a drive attempting to read that area. Examples of subversive data that may be used are described in, for example WO02/11136, WOOO/74053, WO01/61695 and WOO 1/61696, the whole contents of each of which are hereby incorporated by reference. Another possibility may be to inject non-correctable errors in the EFM+ bitstream or to deliberately damage areas of the glass master (and thus of the resultant DVDs) that do not form part of the navigation path in an attempt to make any copy DVD unplayable. These techniques may be used individually or in any combination.

It will of course be appreciated that FIG. 5 is a much simplified example and that a DVD may contain more video title sets and that a video title set may contain many more titles, program chains, programs and cells than are shown in FIG. 5. Also the mapping between logical and physical cells need not be one to one and the physical cells may well be ordered differently from the logical cells.

The manner in which the data processor 2 shown in FIG. 1 operates will now be explained with the aid of the flow charts shown in FIGS. 10 and 11.

Thus, when a user instructs the data processor 2 via the user interface 4 that a DVD video zone is to be produced, the controller 3 first determines, for example on the basis of user input, at SO whether assets are to be encoded or whether the file to be processed is an image file or DDP File Set received by the file receiver 91. If assets are to be encoded then the controller 3 will generally prompt the user via the user interface 4 to provide the required assets which are then received by the asset receiver 5 at SI in FIG. 10. The controller 3 may then prompt the user via the user interface 4 to check that the assets are in the correct data format (for example MPEG 2 for video) and, if not, to instruct the controller 3 to activate the asset encoder 6 to effect the necessary encoding at S2. The controller 3 then at S3 in FIG. 10 controls the authorer 7, under user instructions via the user interface 4, to carry out an authoring process in which the user assembles the assets in the manner he or she desires with user-defined chapters and menus and a user-defined navigation path or paths through the content data and the authorer 7 multiplexes the user selected and organised assets and adds navigational and control data in compliance with the user's instructions and provides a image file or VIDEO_TS directory containing the VOB, IFO, BUP files to the copy protector 8 to produce an image file or DDP File Set.

If the answer at SO is no, then at SIa, the controller 3 causes a received image file or DPP File Set to be supplied to the copy protector 8.

At S4, the copy protector 8 adds copy protection to the image file/DDP File Set. At S5, the copy protector outputs the modified image file or DDP File Set to the master producer 9. At S5*a*, the master producer 9 carries out a conventional mastering process, including the normal processes of encoding the copy-protected image file or DPP File Set in accordance with the appropriate DVD standard specification to produce channel code data for recording, that is carrying out processes such as scrambling, interleaving, error correction and EFM plus encoding in accordance with the appropriate DVD standard specification.

The master file produced by the master producer may be supplied at S6 to the local recorder 12 which records the image file onto a writable DVD disc and adds physical sector address tags to the actual sectors on the optical disc. The output modified DDP File Set may alternatively or additionally be supplied at S7 to the master data file provider 10 which produces a digital linear tape containing the modified DDP File Set for supply to a replicator 11 which may be remotely located. At S8a the replicator produces a glass master carrying the image file and physical sector address tags mapping the logical sector numbers to the actual sectors on the glass master. This glass master is then used at S8b to produce stamping masters from which the final DVD discs are produced at S9 in FIG. 10.

Subversive data may, depending upon the type of subversive data, be added at S60 prior to encoding of the assets, or at S70 prior to the copy protection process, or at S4 as part of the copy protection process, depending upon the type of subversive data. As another possibility, subversive data may be provided by deliberately physically damaging a sector or sectors of the disc during the final recording process by the recorder 12 or during production of the glass master, for example.

Operations carried out by the copy protector 8 in this example will now be described with reference to FIG. 11.

At S10, the user determines which video title set VTS in the original content should be overlapped with a spurious video title set VTS. Alternatively, the copy protector 8 may determine which video title set VTS to overlap with a spurious video title set VTS, based on some analysis of the original content or in accordance with pre-programmed instructions or instructions received from another apparatus.

At S11, the copy protector 8 creates a Video Title Set Information file and its back up for the spurious x+1$^{th}$ video title set VTSx+1 103 a. The spurious Video Title Set Information file and its back up may be created by producing a copy of the Video Title Set Information file and its back up for the selected VTS and then modifying some parts of the copy in order to create the spurious Video Title Set Information file and its back up. As an example, the copy protector 8 may present the user with an interface that enables the user to define the Video Title Set Information for the spurious video title set VTSx+1 103a. For example, the copy protector 8 may provide the user with an interface that enables the user to input information to produce the VTSI table (and its back up) for the spurious video title set VTSx+1 103a or to use the VTSI table (and its back up) for the video title set VTSx 103 (or one of the other video title sets where there is more than one) as the basis for producing the VTSI table (and its back up) for the spurious video title set VTSx+1 103a.

At SI2, the spurious Video Title Set Information file and its back up are added to the image file or VIDEOJTS directory containing the VOB, IFO, BUP files.

At SI3, subversive data may be added to the VTSTTJVOBS 223 to, as discussed above, inhibit production of copies by sector-sector or file-by-file copying apparatus. This subversive data may be referenced by Titles within the spurious VTS but not by the original VTS.

Then at SI4, the copy protector 8, possibly under instructions from the user, updates the Video Manager Information and the Video Title set information for the spurious VTS and for the VMGIs and the original VTSI so that the logical cell pointers for the video title set VTSx 103 point to the correct physical cells in the VTSTT VOB set and logical cell pointers for the spurious video title set VTSx 103a point to physical cells in the VTSTTJVOB set. Where subversive data is present then one or more logical cell pointers for the spurious video title set VTSx+1 103a will point to that subversive data. The other logical cell pointers for the spurious video title set VTSx+1 103a will generally point to the same physical cells as the logical cell pointers of the x$^{th}$ video title set VTSx 103 but in the wrong or a scrambled or random order, so that the content associated with the spurious video title set VTSx+1 103a is unwatchable.

At SI5, the UDF/ISO file structure information is amended. FIG. 9 shows a summary of the information stored in the UDF/ISO file structure for a DVD-Video protected with the above described overlap technique.

Figure 12:
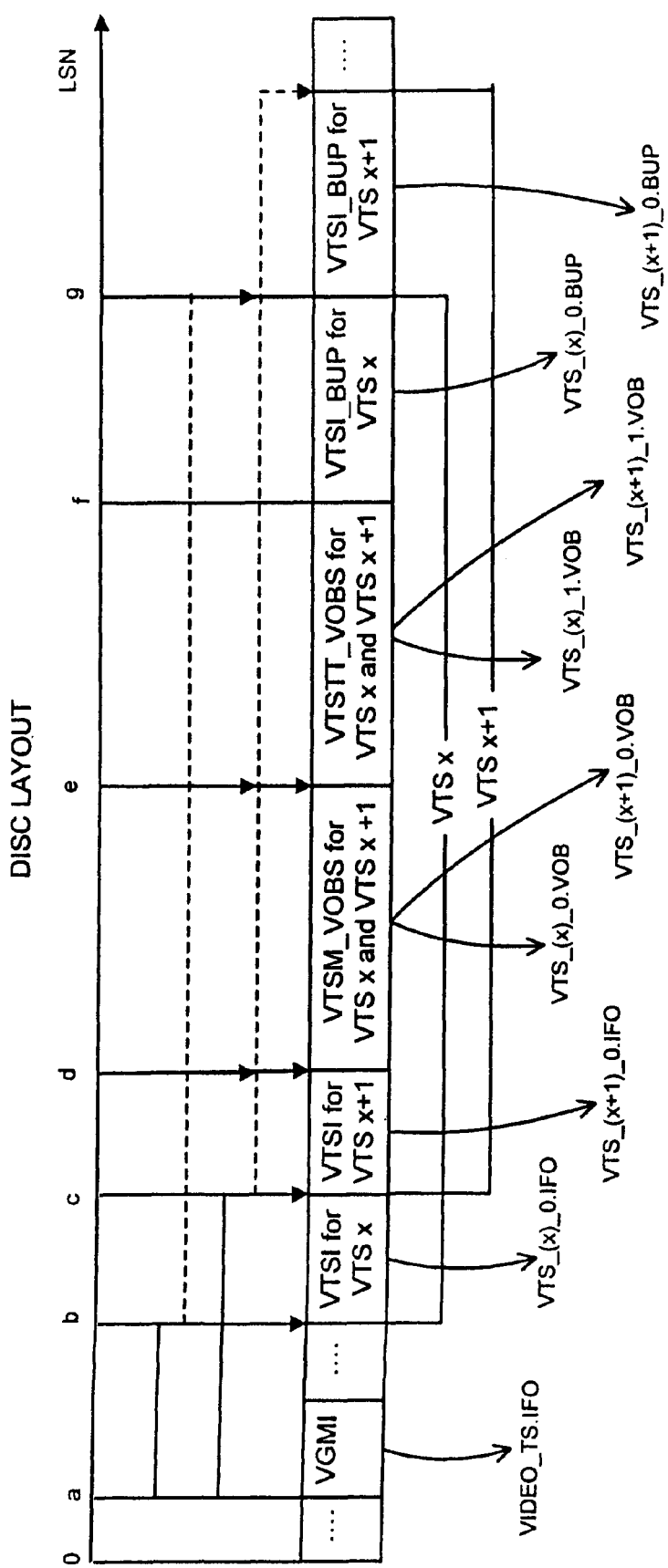
FIG. 12 shows a disc layout for a copy-protected DVD produced the copy protection process of FIG. 11.

As can be seen from FIG. 9, the UDF/ISO file structure information now indicates the presence of two video title sets VTS(x) and VTS (x+1) showing two sets of video objects for each Video Title set, namely VTS (x)_O.VOB, VTS (x)_1.VOB, etc. for the video title set VTS(x), and VTS (x+1)_O.VOB, VTS (x+1)_1.VOB, etc. for the video title set VTS (x+1) such that VTS (x)_O.VOB and VTS (x+1)_O.VOB are shown to be at the same logical sector number ("d" as shown) and VTS (x)J.VOB and VTS (x+1)_1.VOB are similarly shown to be at the same logical sector number ("e" as shown) and so on. FIG. 12 shows the corresponding part of the disc layout with the logical sector numbers (LSN) added.

The copy protector 8 ensures that the navigational commands of the DVD video zone are updated so that a legitimate player will never encounter the spurious video title set VTSx+1 103a. However, as a safety measure, the copy protector 8 may cause the entry PGC of the first title within the spurious video title set VTSx+1 103a to have a pre-command 247 that would redirect a legitimate player back onto the correct navigational path through the DVD.

The modified image file or modified DPP File Set is then recorded or mastered as described above with reference to S6 to S9 in FIG. 10 to produce copy-protected discs.

A navigation information parsing copying apparatus such as an IFO parsing ripper attempting to copy such a copy-protected disc would, when parsing the IFO files, determine from the UDF/ISO file structure information, the Video Manager Information and the Video Title set information, that the DVD video zone includes the two video titles sets VTSx and VTSx+1 and would see that the two video object sets (VTSTx, x+1 VOBS) 222 and 223 were of similar size. Accordingly the ripper may be fooled into selecting the spurious title as being the title to copy. This copy-protection is achieved without having to provide significant additional storage space on the disc for the DVD video zone because the video title object set (VTSTTx, x+1 VOBS) 223 is shared by the x$^{th}$ video title set and the spurious x+1$^{th}$ video title set. Where, as described above, the spurious video title set VTSx+1 has logical cells that point to subversive data, then at least one of the copying process, playability and copy quality of the copy DVD will also be adversely affected whenever the ripper selects the spurious x+1$^{th}$ video title set. Of course, the presence of the subversive data would adversely affect at least one of the copying process, playability and copy quality if a file-by-file ripper should try to copy the DVD.

The VMGI and VTSI tables and the UDF/ISO File Structure information may be updated in such a way that all pointers at all levels within the resulting DVD-Video structure are consistent so that the resulting DVD-Video structure may still be verified by the DVD-Video verification tools used in the DVD-Video field. As another possibility, the UDF/ISO file structure information may be arranged in such a way that the size and/or the start sector address for the VOB files of the spurious VTS is not identical to the size and/or start sector address, respectively, of the original VTS.

As so far described there is a single spurious video title set included in the DVD video zone. However, there may be more than one. For example, three or more video title sets may be interleaved with only one being a legitimate video tile set so that, where there are n interleaved video title sets, the corresponding portion of the DVD video zone carries, in sequence: n VTSIs; n menu VOBs files (if present) shared by the n video title sets; n VOB files shared by the interleaved video title sets; and n BUP files. As another possibility or additionally, if a DVD contains a large number of video title sets there may be more than one set of interleaved video title sets.

As described above all of the pointers in the navigation structure are correct, although some of the pointers in the UDF/ISO file structure information point to the same part of the disc. As a further way of frustrating an IFO parsing ripper, the copy protector may at S4 in FIG. 10 also cause the resulting DVD disc to have one or more ghost video title sets. A ghost video title set may be a "non-existent ghost video title set", that is a video title set that is referenced in the disc information at some level but that does not actually exist on the disc, or a "hidden ghost video title set", that is a video title set that exists (in the example shown in FIGS. 5 and 6 the VTS x+1 video title set may be the ghost video title set) but that is not referenced, or is not referenced properly or not referenced completely, in the disc information.

Figure 13:
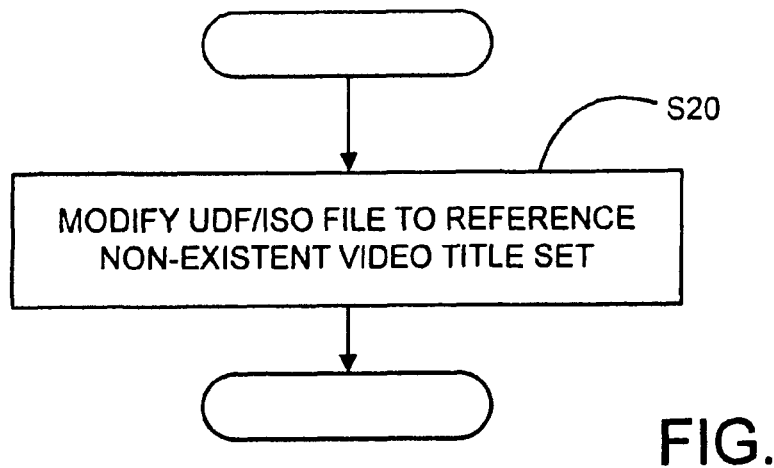
FIGS. 13 to 15 show flow charts for explaining other examples of copy protection processes that may be carried out by the copy protector shown in FIG. 1.
Figure 14:
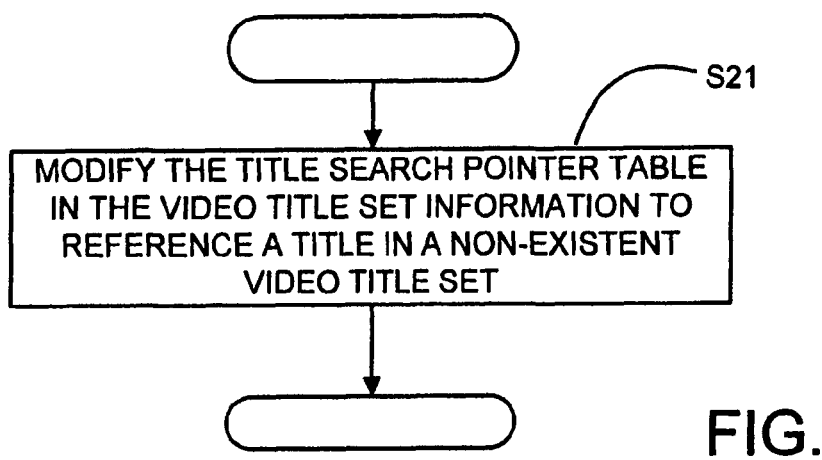
Figure 15:
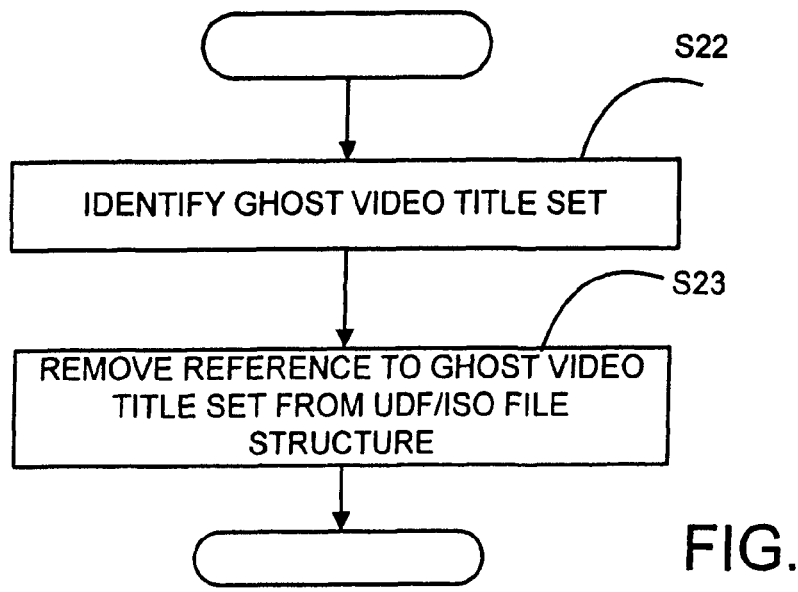

FIGS. 13 to 15 show flow charts illustrating various different ways in which the copy protector 8 may provide such a ghost video title set.

Figure 10:
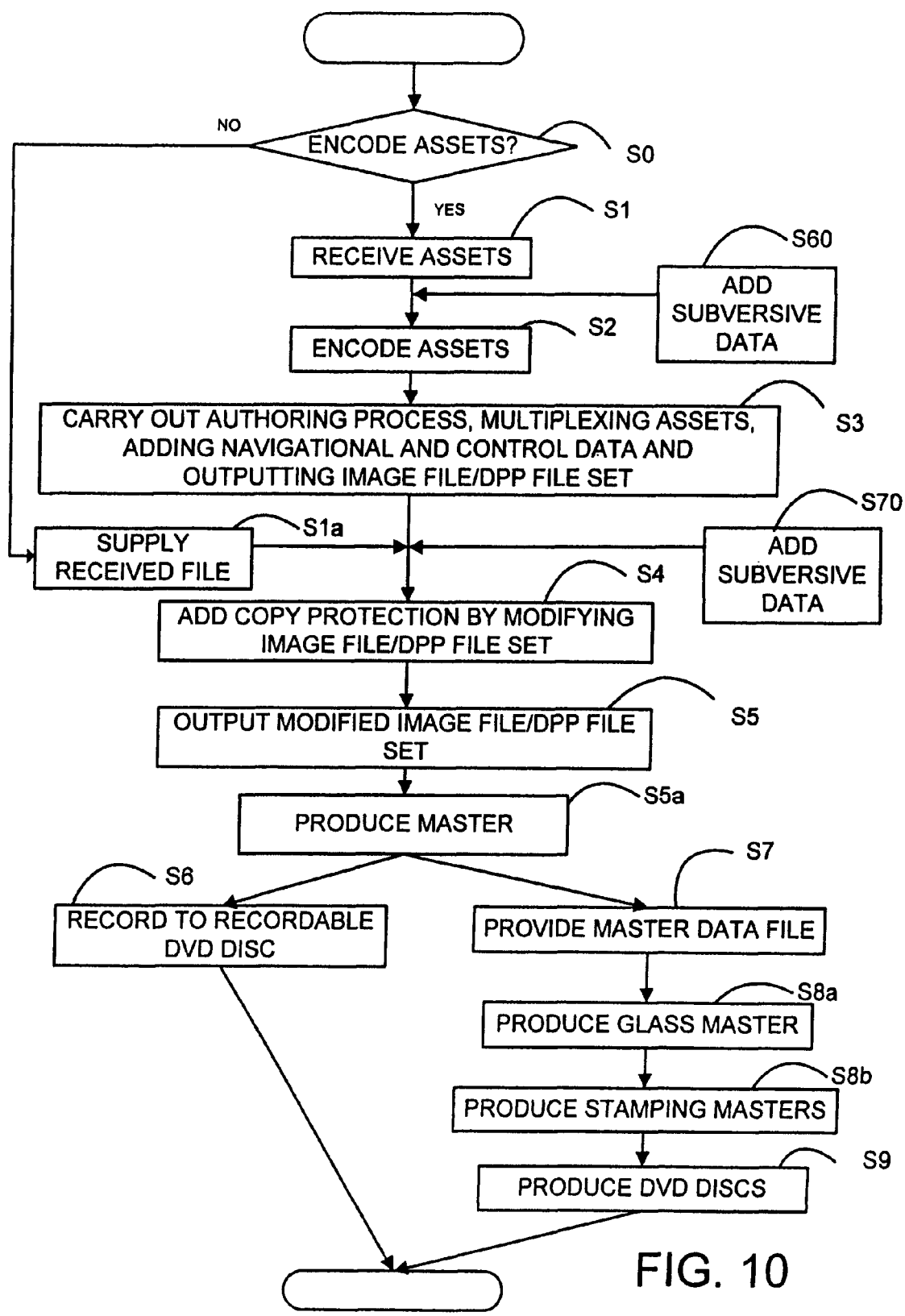
FIG. 10 shows a flow chart for explaining operations carried out by apparatus shown in FIG. 1.
Figure 11:
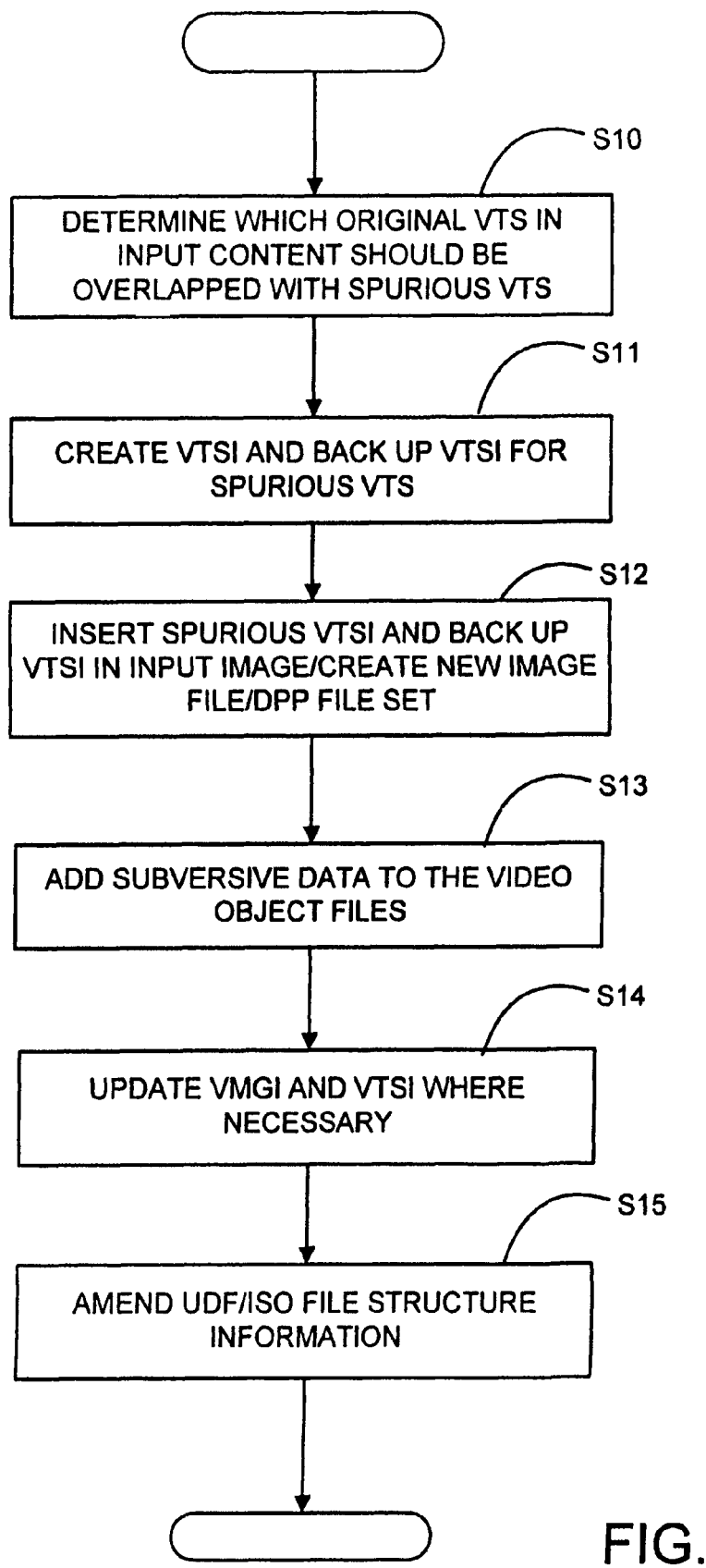
FIG. 11 shows a flow chart for explaining one example of a copy protection process carried out by a copy protector shown in FIG. 1.

In a first example, in the copy protection process of S4 of FIG. 10, as shown at S20 in FIG. 13, the copy protector 8 modifies the UDF/ISO file information structure 202 (FIG. 9) in accordance with instructions received via the user interface 4, so that the UDF/ISO file information structure includes a reference to a non-existent ghost video title set, that is a video title set for which the files do not exist on the disc. The copy protector 8 thus adds a reference to a non-existent ghost video title set VTS_xx_O.IFO to the UDF/ISO file information structure 202. The copy protector 8 may reference the non-existent ghost video title set in the UDF/ISO file information structure 202 with a logical sector number representing a location that does not exist on the disc or representing a location which does not correspond to an IFO file or which correspond to an IFO file (or a portion of it) for a different VTS. The copy protector 8 may or may not add references to a corresponding non-existent video object VOB set and a corresponding back up BUP with again the corresponding logical sector number allocated by the copy protector 8 in the UDF/ISO file information structure being a location that does not exist on the disc or a location which does not correspond to that type of file. The copy protector 8 may or may not reference the ghost video title set in the Title Search Pointer Table (TT_SRPT) 207a within the Video Manager Information 207 (see FIG. 7).

In a second example, in the copy protection process of S4 of FIG. 10, as shown at S21 in FIG. 14, the copy protector 8 modifies the Title Search Pointer Table (TT_SRPT) 207a within the Video Manager Information 207 (see FIG. 7) to refer to a non-existent ghost video title set by adding to the Title Search Pointer Table (TT_SRPT) 207a a reference to a title within a non-existent VTS xx file that is not listed in the UDF/ISO File Structure information 202 (FIG. 9).

In a third example, in the copy protection process of S4 of FIG. 10, as shown in FIG. 15, the copy protector 8 first identifies at S22 a video title set that is to form a hidden ghost video title set by prompting the user, via the user interface 4, to identify such a video title set and, if it does not exist, requesting the user to repeat the authoring process to incorporate such a hidden ghost video title set. Then at S23, the copy protector 8 modifies the UDF/ISO file information structure 202 by removing or corrupting the reference to the selected video title set so that the UDF/ISO file information structure 202 either does not mention the hidden ghost video title set VTS 4 or references a non-existent logical sector number for that hidden ghost video title set.

Figure 16:
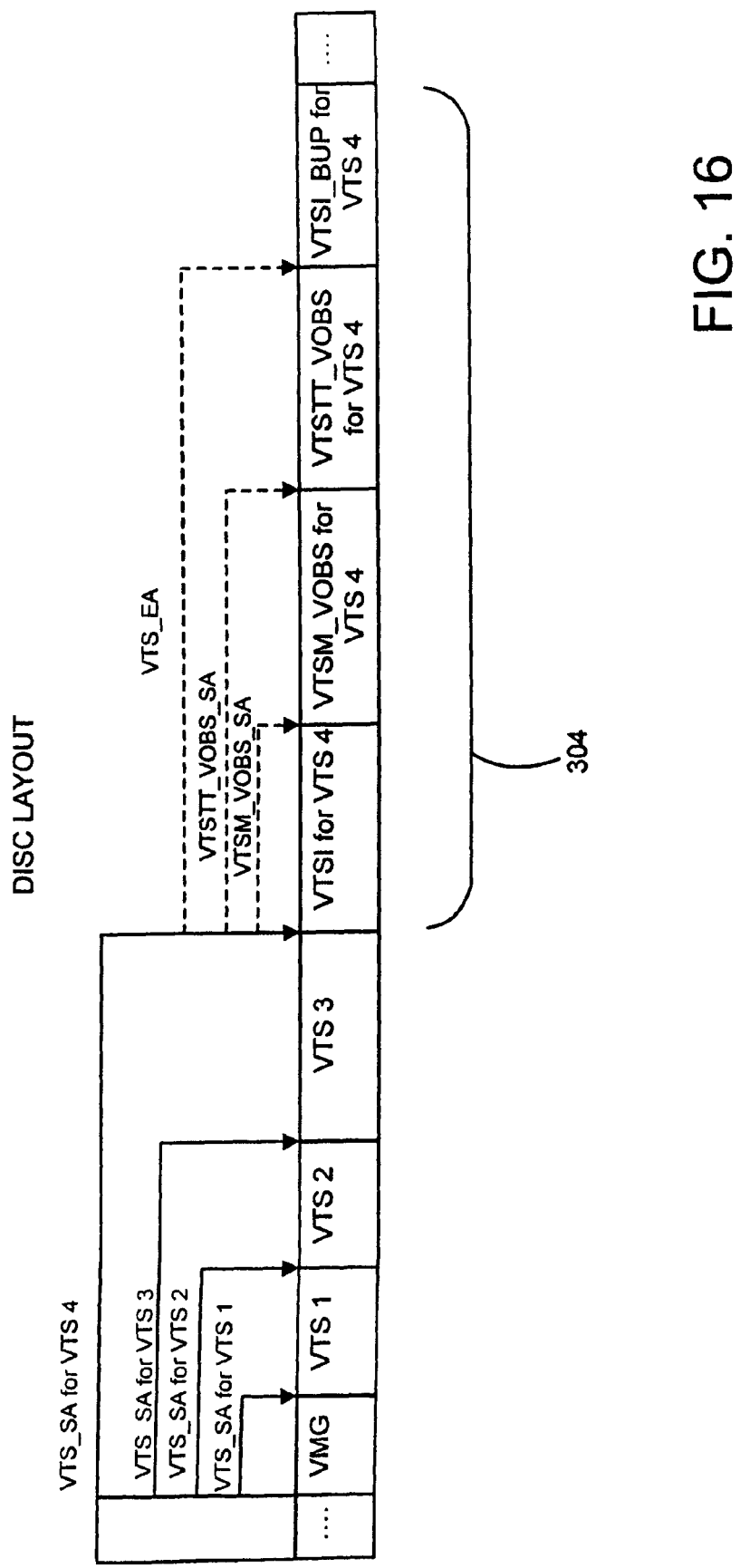
FIG. 16 shows part of a disc layout for a copy-protected DVD produced the copy protection process of FIG. 15.
Figure 17:
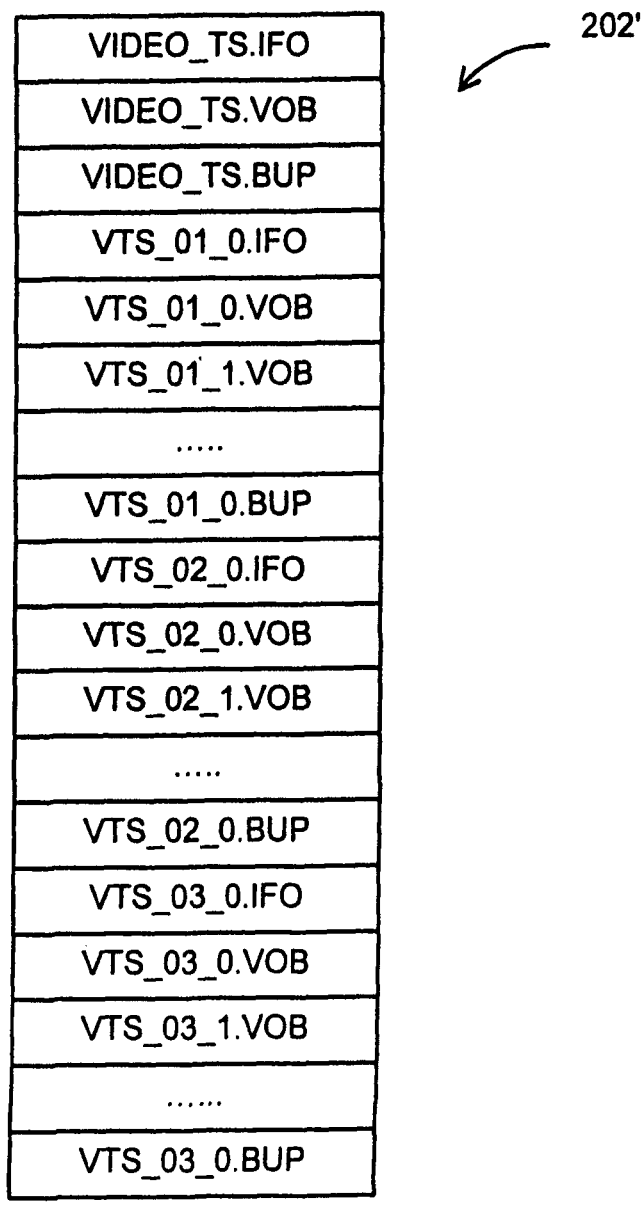
FIG. 17 shows part of the UDF/ISO file structure information for a copy protected DVD produced the copy protection process of FIG. 15.

FIG. 16 shows a part of the disc layout while FIG. 17 shows the corresponding part of the UDF/ISO file information structure 202' for a DVD in which the copy protection described with reference to FIG. 15 has been incorporated. As can be seen from FIG. 16, the disc layout includes a ghost video title set VTS 4 304. The VTS files VTS_xx_*.* for the ghost video title set VTS 4 are correctly and consistently referenced by the navigation information within the IFO files and the ghost video title set VTS 4 is listed in the Title Search Pointer Table (TT_SRPT) 207a within the Video Manager Information 202 (see FIG. 7); however as can be seen from FIG. 17, the reference to the hidden ghost video title set VTS 4 has been removed from the UDF/ISO File Structure 202'.

Figure 18:
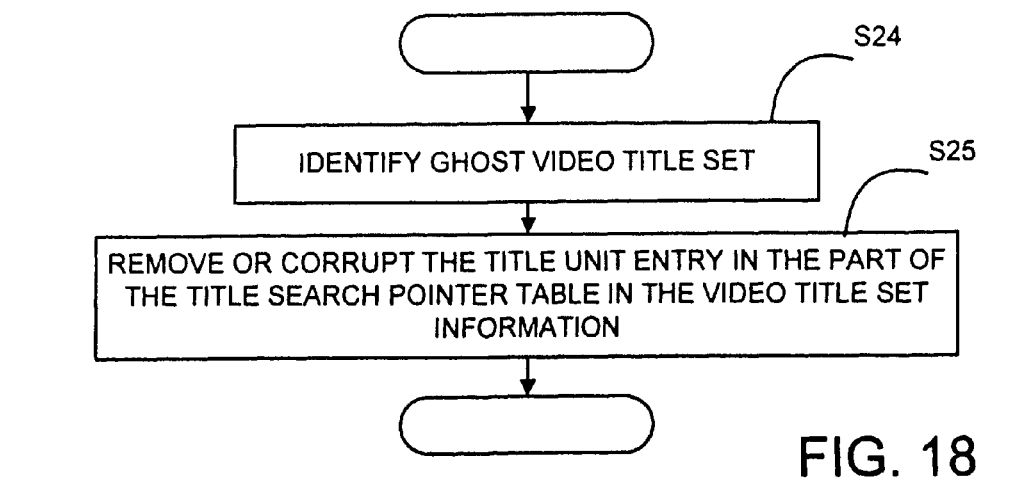
FIGS. 18 to 21 show flow charts for explaining other examples of copy protection processes that may be carried out by the copy protector shown in FIG. 1.

In another example, in the copy protection process of S4 of FIG. 10, as shown at in FIG. 18, the copy protector 8 first identifies at S24 a video title set that is to form a ghost video title set by prompting the user to identify such a video title set and, if it does not exist, requesting the user to repeat the authoring process to incorporate such a ghost video title set. As another possibility, a ghost video title set may be added by amending the relevant tables accordingly, that is without the need to re-author the DVD project. Then at S25, the copy protector 8 removes or corrupts the title unit entry for the ghost video title set in the part of title search pointer table VTS JPTT_SPRT in the Video Title Set Information (see FIG. 8) so that the part of title search pointer table either does not mention the ghost video title set VTS 4 or provides an incorrect reference. Thus, in this example, the ghost video title set within VTS xx is listed in the TT_SRPT and the relative VTS_xx_*.* files are correctly listed in the UDF/ISO File Structure information and correctly stored on the disc. However, the title unit entry for this title, within the VTS Part of Title Search Pointer Table (VTS_PTT_SRPT) either does not exist or is incorrect or corrupt, for example it may reference a nonexistent PGCNz.

In the examples illustrated by FIGS. 13 to 18, the copy protector 8 provides ghost video title sets by providing inconsistencies between the disc information regarding the number of video title sets present on the disc (that is information in at least one of UDF/ISO file structure, VTSI and VGMI) and the actually recorded number of video title sets. Such ghost video title sets may confuse an IFO parsing ripper sufficiently to cause that ripper to fail and/or to report a disc error when it is trying to determine the content of such a copy protected DVD.

Such ghost video title sets may be additional to the spurious title set mentioned above. As another possibility, where the ghost video title set is a hidden ghost video title set (that is the physical files exist), then the spurious title set may be the ghost video title set. Also the copy protector 8 may provide (for example under user instruction via the user interface 4 or in accordance with existing instructions or instructions received from another apparatus) more than one ghost video title set. Where there is more than one ghost video title set then these may include both hidden and non-existent ghost video title sets.

In some of the above examples, the ghost video title set exists as physical data on the DVD but is hidden. In these cases, the ghost video title set may actually be the main video title set. In such circumstances, the navigational commands incorporated within the DVD would direct a legitimate player to that ghost video title set. In this case, for example, some or all the files for the main VTS may not be listed in the UDF/ISO File System information, but their content may be stored on the Volume and may be referenced correctly by the IFO tables so that a legitimate player would be able to access them.

As described above, a ghost video title set(s) is (are) provided. As another possibility or additionally, a ghost title may be provided by modifying the TT_SRPT (207a in FIG. 7) within the VMGI and/or the VTS_PGCIT (21 0b in FIGS. 8a and 8d) within the VTSI for some VTS and possibly other tables such as the VTS_PTT_SRPT (210a in FIGS. 8a and 8b) and the VTSJTMAPT (210c in FIG. 8a), to indicate that a title exists when it does not, or vice versa. Where the ghost title exists as physical data on the DVD but is hidden, then that ghost title) may actually be the main title and, in such circumstances, the navigational commands incorporated within the DVD would direct a legitimate player to that ghost title. In this example, the title may not be listed in the TT_SRPT. However it will have a VTS_PGCI exists for it and a legitimate player may be instructed to access it from another title using suitable command, such as a linkPGCN command.

The copy protector may alternatively or additionally provide a ghost program chain or cell, for example.

To illustrate possible examples, FIG. 5 shows in dotted/phantom lines a ghost video title 107y (TITLE y (TTN y), a ghost entry program chain I11y having a post command 249y, a ghost program PG 114y and a ghost cell 1 Hay.

Any ghost video title 107y may be within any of the video title sets, as shown in FIG. 5 it is within the video title set VTSx. As shown by the chain dotted line 2000, the ghost video title 107y may be associated with an actual program chain such as the program chain 111 or may be associated with a ghost program chain such as the program chain 111y as shown by the dotted line 2001. Any ghost program chain such as the ghost program chain I11y may be associated with a ghost title as indicated by the dotted line 2001 or an actual title (such as TITLE x (TTN x) as indicated by the dash dot line 2002. Any ghost program such as the ghost program 114y may be associated with a ghost program chain such as the ghost program chain I11y as indicated by the dotted line 2003 or with an actual program chain such as program chain 111 as indicated by the dash double dot line 2004. Similarly, any ghost cell such as the ghost cell 1 May may be associated with a ghost program such as the ghost program 114y as indicated by the dotted line 2005 or with an actual program such as program 114ₙ as indicated by the long dash short dash line 2006.

Figure 19:
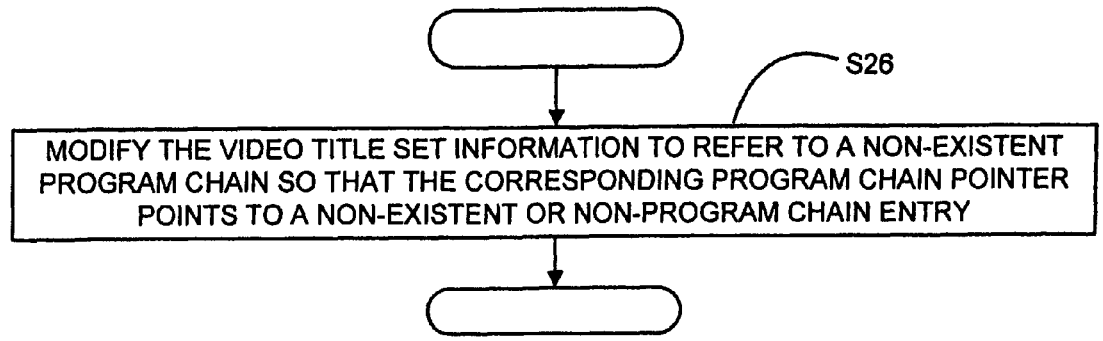
Figure 20:
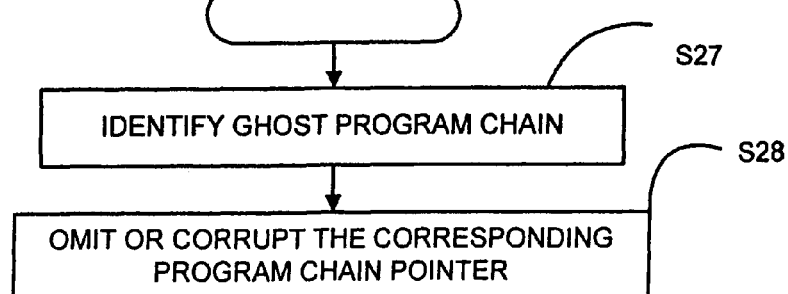
Figure 21:
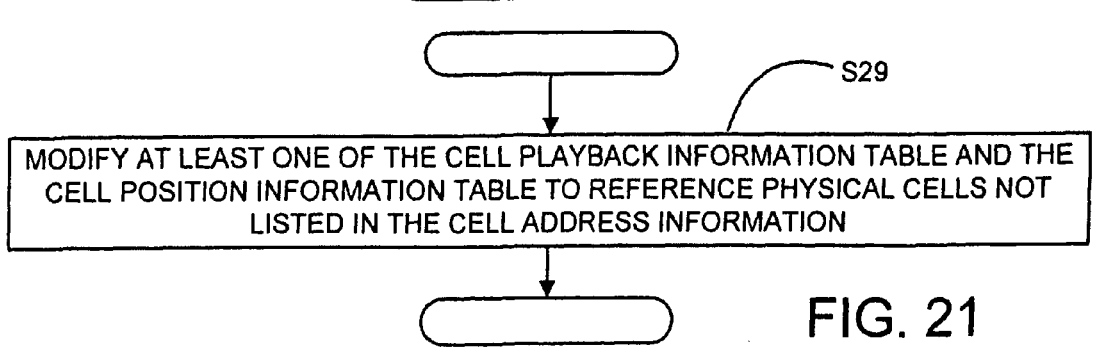

FIGS. 19 to 21 show flow charts illustrating various ways in which rather than providing a disc with a ghost video title set, the copy protector may provide a disc with a ghost title or program chain or cell.

In an example illustrated by FIG. 19, in the copy protection process of S4 of FIG. 10, the copy protector 8 provides a DVD with a non-existent ghost program chain by at S26 modifying the video title set part of title search pointer table VTS_PTT_SRPT in the VTSI to refer to a program chain that does not exist and causing the corresponding VTS_PGCI Search Pointer (VTS_PGCI_SRP) to point to a location that does not exist on the disc or that is not a VTS_PGCI entry.

In an example illustrated by FIG. 20, the copy protector 8 provides a hidden ghost program chain by at S27 first identifying a program chain that is to form a hidden ghost program chain by prompting the user to identify the required program chain and, if it does not exist, requesting the user to repeat the authoring process to incorporate a program chain to provide the hidden ghost program chain. Then at S28, the copy protector 8 removes or corrupts the VTS_PGCI Search Pointer (VTSJPGCIJSRP) for that program chain so that it points to a location that does not exist on the DVD or that is not a VTS_PGCI entry, so hiding the program chain.

In an example illustrated by FIG. 21, the copy protector 8 provides a non-existent ghost physical cell by at S29 modifying at least one of the cell playback information table (C_PBIT) and the cell position information table (C_POSIT) in the Video Title Set Program Chain Information Table (VTS_PGCIT) of the VTSI to reference a physical cell or cells not listed in the Video Title Set Cell Address Table (VTS_C_ADT) of the VTSI. As another possibility, the copy protector 8 may request the user to identify an existing physical cell that is to form a hidden ghost physical cell and the copy protector may modify at least one of the cell playback information table (C_PBIT) and the cell position information table (C_POSIT) so that it is inconsistent with the Video Title Set Cell Address Table (VTS_C_ADT) of the VTSI.

Such ghost program chains or cells may or may not be in the spurious video title set described above with reference to FIGS. 11 and 12. Also the copy protector may provide, under user instruction, more than one ghost program chain or cell. Where there is more than one ghost program chain or cell then these may include both hidden and non-existent ghost program chains or cells.

FIGS. 19 to 21 describe ways of providing on a DVD disc ghost program chains or ghost physical cells that may confuse an IFO parsing ripper sufficiently to cause that ripper to report a disc error when it is trying to determine the content of such a copy protected DVD.

The copy protection procedures describe above with reference to FIGS. 13 to 21 have been described as individual copy protection procedures. However, the copy protector 8 may combine these procedures. For example, the copy protector 8 may combine any one of the procedures described above with reference to FIGS. 13 to 18 with the procedure described with reference to FIG. 19 or 20 and/or the procedure described with reference to FIG. 21. Similarly, the copy protector 8 may combine the procedure described with reference to FIG. 19 or 20 with the procedure described with reference to FIG. 21. Furthermore any of the copy protection procedures described with reference to FIGS. 13 to 18 may be carried out without the copy protection procedure described above with reference to FIGS. 11 and 12.

As shown in FIG. 1, the producing apparatus 1 has both authoring functionality (asset receiver 5, asset encoder 6 and authorer 7) and a file receiver 91. Where appropriate the apparatus may include only one of these, that is either the authoring functionality or the file receiver 91.

In the above-described embodiments, the recording medium is a DVD or a precursor such as a glass master or stamping master. The recording medium may be another form of optical disc or a precursor. It will, of course, be appreciated that the present invention may be applied to other forms of digital recording media such as, for example, magnetic or magneto-optical recording discs. In addition, as described above, the recording medium is a disc that is read by spinning or rotating the disc about a central axis. It may, however, also be possible to apply the present invention to digital recording media in the form of Digital Linear Tape which is transported along a path past, rather than rotated with respect to, a read/write head.

What is claimed is:

1. An apparatus for providing recording data to be recorded onto a recording medium where the recording data comprises content data including a video object file and control data including a video title set for enabling a player playing such a recording medium to navigate through the content data, the apparatus comprising a data processor programmed to provide recording data comprising a content data set and a spurious data set including a video title set associated with respective control data, wherein the spurious data set shares the video object file of the content data set and has no other associated video object file.

2. The apparatus of claim 1, wherein the data processor is programmed to:
associate the content data set with control data that enable a player accessing the content data set to play the content data correctly;
associate the spurious data set with control data that inhibit a player accessing the spurious data set from at least one of playing the content data and playing the content data correctly; and
provide play control data that, when a player plays the recording medium, causes the player to ignore the spurious content data set.

3. The apparatus of claim 1, wherein the data processor is programmed to provide the recording data so that at least one of:
the control data for the content data set and for the spurious data set are provided before the content data;
back up control data are provided for the content data set and for the spurious data set and the back up control data for the content data set and for the spurious data set are provided after the content data.

4. The apparatus of claim 1, wherein the data processor is further programmed to at least one of:
provide the shared video object data set for the video title sets;
provide a volume information file structure in which the content data set and the spurious content data set are listed as respective video title sets and the video object data set is listed for each of the video title sets; and
provide back up video title set information for the content data set and for the spurious data set and organise the recording data so that the video title set information for the content data set and for the spurious data set both precede the shared video object data file and the back up video title set information for the content data set and for the spurious data set follow the are provided after the shared video object data file.

5. The apparatus of claim 1, wherein the data processor is further programmed to cause at least one of:
logical cells of the spurious video title set to point to physical cells of the content data in an incorrect or random order; and
the content data to include physical cells containing subversive data and logical cells of the spurious video title set but not of the video title set to point to physical cells containing subversive data.

6. The apparatus of claim 1, wherein the data processor is further programmed to provide video manager information and a volume information file structure, and wherein the data processor is programmed to provide a ghost file by causing an inconsistency, wherein the inconsistency comprises at least one of an inconsistency in the control data and an inconsistency between the control data and the content data.

7. The apparatus of claim 6, wherein the data processor is programmed to provide a ghost video title set by rendering information in at least one of the video title set information, video manager information and the volume information file structure inconsistent with the video title sets in the recording data.

8. The apparatus of claim 6, wherein the data processor is programmed to provide a ghost video title set by at least one of:
adding a reference to a non-existent video title set to at least one of the volume information file structure and a title search pointer table of the video manager information;
removing a reference to an existing video title set from at least one of the volume information file structure and a title search pointer table of the video manager information; and
removing a reference to an existing video title set from a video title set part of title search pointer table of the video title set information.

9. The apparatus of claim 6, wherein the data processor is programmed to provide at least one of:
a ghost video title set by adding a reference to a non-existent video title set to at least one of the volume information file structure and a title search pointer table of the video manager information;
a ghost video title set by removing a reference to an existing video title set from at least one of the volume information file structure and a title search pointer table of the video manager information;
a ghost video title set by removing a reference to an existing video title set from a video title set part of title search pointer table of the video title set information;
a ghost program chain by referring to a non-existent program chain in the video title set program chain information table;
a ghost program chain by removing a reference to an existing program chain from the video title set program chain information table; and
a ghost physical cell by rendering physical cells of the recording data inconsistent with at least one of a cell playback position information table and a cell position information table.

10. An apparatus for providing recording data to be recorded onto a recording medium, the apparatus comprising a data processor programmed to:
provide recording data comprising at least one video title set having content data comprising a video object data set, video title set information for the video title set, video manager information and a volume information file structure; and
provide a ghost video title set by rendering information in at least one of the video title set information, video manager information and the volume information file structure inconsistent with the video title set or sets in the recording data by at least one of: adding a reference to a non-existent video title set to at least one of the volume information file structure and a title search pointer table of the video manager information, removing a reference to an existing video title set from at least one of the volume information file structure and a title search pointer table of the video manager information, and removing a reference to an existing video title set from a video title set part of title search pointer table of the video title set information.

11. The apparatus of claim 10 wherein the data processor is programmed to provide at least one of:
a ghost title in a video title set;
a ghost program chain by referring to a non-existent program chain in the video title set program chain information table;
a ghost program chain by removing a reference to an existing program chain from the video title set program chain information table; and a ghost physical cell by rendering physical cells of the recording data inconsistent with at least one of a cell playback position information table and a cell position information table.

12. A method implemented in a data processor for providing recording data to be recorded onto a recording medium the method comprising:

receiving a content data set having content data including a video object file and control data including a video title set;

storing the received content data set in a computer readable memory;

generating at a processing unit recording data by adding a spurious data set including a video title set to the content data set by sharing at least some of the content data of the video object file of the content data set with the spurious data set and the spurious data set having no other associated video object file; and providing the recording data to a master producer for recording the recording data onto the recording medium.

13. The method of claim 12, wherein the generating of the recording data comprises:

associating the content data set with control data that enable a player accessing the content data set to play the content data correctly;

associating the spurious data set with control data that inhibit a player accessing the spurious data set from at least one of playing the content data and playing the content data correctly; and providing play control data that, when a player plays the recording medium, causes the player to ignore the spurious content data set.

14. The method of claim 12, wherein the generating of the recording data comprises at least one of:

providing a volume information file structure in which the content data set and the spurious content data set are listed as respective video title sets and the video object data set is listed for each of the video title sets;

providing back up video title set information for the content data set and for the spurious data set; and organising the recording data so that video title set information for the content data set and for the spurious data set both precede a video object data file shared by the content data set and the spurious content data set, and so that back up video title set information for the content data set and for the spurious data set are provided after the content data.

15. The method of claim 12, wherein the generating of the recording data further comprises causing at least one of:

logical cells of the spurious video title set to point to physical cells of the content data in an incorrect or random order; and the content data to include physical cells containing subversive data and logical cells of the spurious video title set but not of the video title set to point to physical cells containing subversive data.

16. The method of claim 12, wherein the control data is further provided as video manager information and a volume information file structure, and the generating of the recording data further comprises providing a ghost file by causing an inconsistency, wherein the inconsistency comprises at least one of an inconsistency in the control data and an inconsistency between the control data and the content data.

17. The method of claim 16, wherein the ghost video title set is provided by rendering information in at least one of the video title set information, video manager information and the volume information file structure inconsistent with the video title sets in the recording data.

18. The method of claim 16, wherein a ghost video title set is provided by at least one of:

adding a reference to a non-existent video title set to at least one of the volume information file structure and a title search pointer table of the video manager information;

removing a reference to an existing video title set from at least one of the volume information file structure and a title search pointer table of the video manager information; and removing a reference to an existing video title set from a video title set part of title search pointer table of the video title set information.

19. The method of claim 16, wherein the generating of the recording data comprises providing at least one of:

a ghost video title set by adding a reference to a non-existent video title set to at least one of the volume information file structure and a title search pointer table of the video manager information;

a ghost video title set by removing a reference to an existing video title set from at least one of the volume information file structure and a title search pointer table of the video manager information;

a ghost video title set by removing a reference to an existing video title set from a video title set part of title search pointer table of the video title set information;

a ghost program chain by referring to a non-existent program chain in the video title set program chain information table;

a ghost program chain by removing a reference to an existing program chain from the video title set program chain information table; and a ghost physical cell by rendering physical cells of the recording data inconsistent with at least one of a cell playback position information table and a cell position information table.

20. A method implemented in a data processor for providing recording data to be recorded onto a recording medium, the method comprising:

receiving recording data comprising at least one video title set having content data comprising a video object data set, video title set information for the video title set, video manager information and a volume information file structure;

storing the received recording data in a computer readable memory;

modifying at a processing unit the recording data by rendering information in at least one of the video title set information, video manager information and the volume information file structure inconsistent with the video title set or sets in the recording data to provide a ghost video title set by at least one of adding a reference to a non-existent video title set to at least one of the volume information file structure and a title search pointer table of the video manager information, removing a reference to an existing video title set from at least one of the volume information file structure and a title search pointer table of the video manager information, and removing a reference to an existing video title set from a video title set part of title search pointer table of the video title set information; and providing the modified recording data to a master producer for recording the modified recording data onto the recording medium.

21. The method of claim 20, wherein the modifying of the recording data comprises providing at least one of:

a ghost title in a video title set;

a ghost program chain by referring to a non-existent program chain in the video title set program chain information table;

a ghost program chain by removing a reference to an existing program chain from the video title set program chain information table; and a ghost physical cell by rendering physical cells of the recording data inconsistent with at least one of a cell playback position information table and a cell position information table.

22. A digital versatile disk having recording data recorded thereon, wherein the recording data comprises a content data set including a video object file and a spurious data set each having control data each including a video title set, and the spurious data set shares at least some of the video object file of the content data set and has no other associated video object file.

23. A digital versatile disk having recording data recorded thereon, wherein the recording data comprises at least one video title set having content data comprising a video object data set, video title set information for the video title set, video manager information and a volume information file structure; and wherein information in at least one of the video title set information, video manager information and the volume information file structure is rendered inconsistent with the video title set or sets in the recording data to provide a ghost video title set by at least one of adding a reference to a non-existent video title set to at least one of the volume information file structure and a title search pointer table of the video manager information, removing a reference to an existing video title set from at least one of the volume information file structure and a title search pointer table of the video manager information, and removing a reference to an existing video title set from a video title set part of title search pointer table of the video title set information.

* * * * *